(12) United States Patent
Denpo et al.

(10) Patent No.: US 6,589,918 B2
(45) Date of Patent: Jul. 8, 2003

(54) CONDUCTIVE GREASE AND ROLLING APPARATUS PACKED WITH THE SAME

(75) Inventors: Katsuaki Denpo, Kanagawa (JP); Atsushi Yokouchi, Kanagawa (JP); Koichi Hachiya, Kanagawa (JP); Michiharu Naka, Kanagawa (JP); Tooru Shouda, Kanagawa (JP); Hideki Koizumi, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/884,947

(22) Filed: Jun. 21, 2001

(65) Prior Publication Data
US 2002/0019319 A1 Feb. 14, 2002

(30) Foreign Application Priority Data

| Jun. 22, 2000 | (JP) | 2000-187069 |
| Nov. 29, 2000 | (JP) | 2000-362271 |
| Dec. 18, 2000 | (JP) | 2000-384186 |
| Mar. 7, 2001 | (JP) | 2001-062974 |
| Apr. 3, 2001 | (JP) | 2001-105269 |

(51) Int. Cl.⁷ .......................................... C10M 125/02
(52) U.S. Cl. .................... 508/100; 508/109; 508/116; 508/126; 508/128; 508/130
(58) Field of Search ................ 508/100, 109, 508/116, 126, 128, 130

(56) References Cited

U.S. PATENT DOCUMENTS

| 3,671,429 A | * | 6/1972 | Wright | 508/136 |
| 4,908,143 A | * | 3/1990 | Dumdum et al. | 72/42 |
| 5,093,015 A | * | 3/1992 | Oldiges | 508/117 |
| 5,154,840 A | * | 10/1992 | Drake et al. | 508/117 |
| 5,167,851 A | * | 12/1992 | Jamison et al. | |
| 5,437,802 A | * | 8/1995 | Kurahashi et al. | 508/117 |
| 5,670,461 A | * | 9/1997 | Schreiber et al. | 508/117 |
| 5,744,431 A | * | 4/1998 | Diaz et al. | 508/410 |
| 5,773,394 A | | 6/1998 | Wan et al. | |
| 5,981,641 A | * | 11/1999 | Takahashi et al. | 524/428 |
| 6,040,277 A | * | 3/2000 | Caporiccio | 508/155 |
| 6,136,758 A | * | 10/2000 | Yamada et al. | 508/172 |
| 6,372,337 B2 | * | 4/2002 | Takahashi et al. | 428/328 |

FOREIGN PATENT DOCUMENTS

| JP | A-47-21402 | 10/1972 |
| JP | A-47-21403 | 10/1972 |
| JP | A-57-3897 | 1/1982 |
| JP | A-01-307516 | 12/1989 |
| JP | A-03-35091 | 2/1991 |
| JP | A-U-03-88018 | 9/1991 |

* cited by examiner

Primary Examiner—Jacqueline V. Howard
(74) Attorney, Agent, or Firm—Sughrue Mion, PLLC

(57) ABSTRACT

This invention is to provide a conductive grease which is less to decrease conductivity as a time passes. The conductive grease comprises abase oil, a thickener, a conductive solid powder, and at least one kind of a wear inhibitor, an extreme pressure agent and an oiliness agent, wherein an amount of the conductive solid powder added is 0.1 to 10 wt %, and an amount of the at least one kind of a wear inhibitor, an extreme pressure agent and an oiliness agent added is 0.1 to 10 wt %. Further, the conductive grease comprises the base oil and at least one of conductive additives, and the conductive additives are fibrous carbon, metallic particle, metallic compound particle and carbon nano-tube. The conductive grease to be packed into the rolling bearing comprises conductive fine particles such as carbon black and has an oil separation degree of 2% or lower. A ball bearing to be favorably used at high temperature comprises an inner race and an outer race, and a plurality of balls freely rotating between both races, and the conductive grease packed into a space defined between both races and holding the plural balls therein, and the conductive grease comprises the base oil, a thickener comprising fluorine compound or silicone compound and 0.2 to 10 wt % of the carbon black.

19 Claims, 22 Drawing Sheets

- DTP METALLIC COMPOUNDS

M: METAL
R: ALKYL GROUP,
   ARYL GROUP
   ALKYLARYL GROUP

- DTC METALLIC COMPOUNDS

- TCP

- TOP

- PHOSPHOROUS ACID ESTERS (WHICH USUALLY SHOW TAUTOMERISM)

(KETO FORM)     (ENOL FORM)

SAMPLING
PERIOD

10KV 1000× 10.0 μm 0000

1%-A : TEST GREASE (OIL SEPARATION DEGREE : 1%)

1%-B : TEST GREASE (OIL SEPARATION DEGREE : 1%)
       +2.5% OF SUCCINIC ACID ANHYDRIDE ADDITIVE

3% : TEST GREASE (OIL SEPARATION DEGREE : 3%)

CONDUCTIVE GREASE AND ROLLING APPARATUS PACKED WITH THE SAME

FIELD OF THE INVENTION

This invention relates to a conductive grease, and in particular to such a conductive grease less to reduce conductivity as time passes.

The invention further relates to a conductive grease having excellent conductivity and being less to reduce the conductivity as time passes, and specially to such a conductive grease to be suitably applied to various kinds of rolling bearings, decreasing electrical resistance between inner and outer races.

The invention still further relates to a rolling bearing such as a ball bearing, and particularly to such a rolling bearing employing a grease having conductivity as a lubricant.

The invention yet further relates to a rolling bearing under a conductive condition between the outer race and the inner race, and more particularly to such a rolling bearing to be favorably used to parts at high temperatures in office machinery or information equipment such as copiers, laser beam printers and others (sensitive drum (fixing part), heat roller supporters).

BACKGROUND OF THE INVENTION

In general information equipment, for example, in copiers, movable parts use lots of rolling bearings. Between a raceway surface and rolling elements of the rolling bearing, an oil film is formed during rotation to provide a non-contact between both. In the rolling bearing, since static electricity occurs accompanying with the rotation, there probably arises inconveniences that radiation noises thereby give bad influences as distortion and others to copied images of the copier.

For preventing such inconveniences, a prior art has taken a measure that the conductive grease is packed into the rolling bearing to make the inner and outer bearing races and the rolling elements conductive, and one of the inner and outer bearing races is grounded for removing the static electricity from the rolling bearing.

This matter will be explained with reference to FIG. 24 of the attached drawings.

A ball bearing 121 of FIG. 24 comprises an outer race 122, an inner race 123, a plurality balls 124 rotatably arranged between the outer race 122 and the inner race 123, a cage (holder) 125 holding the plural balls 124, and contacting seals 126, 126 furnished in sealing grooves 122b of the outer race 122. A space defined by the outer race 122, the inner race 123, and the seals 126, 126 encircling is charged with the conductive grease 127, and is sealed within the ball bearing 121 by the seals 126.

Contacting faces between raceway surfaces 122a, 123a of both races 122, 123 and balls 124 are lubricated by the conductive grease 127, while the outer race 122, the inner race 123 and the balls 124 are made conductive. Further, the outer race 122 or the inner race 123 is grounded (not shown) through the information equipment, for example, the copiers employing the ball bearing 121 so as to cancel static electricity generated by rotation of the ball bearing 121.

A popular conductive grease is, for example, that carbon black is added as a thickener and a conductive additive (disclosed in JP-B-63-24038), and such a conductive grease displays an excellent conductivity at a beginning period of service. (The term "JP-B" as used herein means an "examined Japanese patent publication")

However, the conventional conductive grease using the carbon black has a problem that it shows the excellent conductivity at the beginning period, but the conductivity goes down as a time passes.

In short, although the rolling bearing packed with the conductive grease shows the excellent conductivity at the beginning period (the inner and outer raceway surfaces and the rolling elements are conductive), the conductivity declines as the time passes so that resistance value between the inner and outer races of the rolling bearing becomes larger (called as "bearing resistance value" hereafter).

Causes for these phenomena have hitherto been considered as follows. The conductive grease enough exists at the beginning in the contacting faces between the rolling elements and the raceway surfaces of the bearing races of the rolling bearing, and the carbon black in the conductive grease maintains the conductivity between the raceway surfaces and the rolling elements, but owing to relative movements between the raceway surfaces and the rolling elements, the conductive grease is expelled from the contacting face, otherwise chain structures of the carbon black particles are broken. Thus, there occurs a problem that the conductivity declines and the bearing resistance value becomes large as the time passes.

Further, it has been assumed that the conductive grease expelled from the contacting face is difficult to again enter the contacting face, because a worked penetration of this kind of greases is low, and the conductive additive is a fine particle insoluble in the base oil.

It has also been assumed that the conductive grease expelled from the contacting face is difficult to again enter the contacting face, because the conductive additive is a fine particle insoluble in the base oil.

It is disclosed in JP-A-1-307516 that a measure for preventing the time-passing decline in the conductivity of the grease is to limit the worked penetration and soften the conductive grease for avoiding the grease from hardening. (The term "JP-A" as used herein means an "unexamined published Japanese patent application") The conductive fine powder as the carbon black is, if being sole, shorter in capacity as the thickener than generally known thickener as metallic soaps or urea compound, and oil separation degree of the resulting grease exceeds 2%.

However, inventors made earnest studies and have come to an assumption that the time-passing changes of the conductivity (resistance value) are generated by factors as mentioned below.

The rolling bearing (the ball bearing having the inner diameter: 8 mm, the outer diameter: 22 mm, the width: 7 mm) packed with the conventional conductive grease containing the carbon black was offered to a rotation test (radial load (Fr): 19.6N, rotational speed: 150 rpm ($min^{-1}$), rotating time: 500 hours, test temperature: 25° C.), and the raceway surface of the rolling bearing after the rotation test was investigated by a scanning type electron microscope (SEM) and an energy dispersive spectrometer (EDS). As examples, FIG. 13 shows an SEM image of the raceway surface of the inner race, and FIG. 14 shows an EDS measuring chart.

From the SEM image of FIG. 13, it is seen that a ground face in the raceway surface of the inner race disappears at a beginning period and wear appear, from which the abrasion is recognized in the raceway surface. Peaks of oxygen are seen in the EDS measuring chart of FIG. 14, from which an oxide film is recognized in the raceway surface.

From them, it may be assumed that the cause for the time-passing change in the conductivity depends on formation of the oxide film in the raceway surface owing to shortage in the lubricating capacity of the conductive grease rather than deterioration in performance of the conductive grease.

That is, fine injuries appear in the raceway surface by metal contact between the surface of the rolling elements and the raceway surface. In the injured part, a new face is exposed, and since the new face has a high activity, it is instantly oxidized by oxygen in an air to form the oxide film. This oxide film deteriorates the conductivity to result in heightening the time-passing resistance value.

From the peaks of the EDS measuring chart, it is seen that components of fine amounts contained in the carbon black form films on the raceway surface by the influence of rotation of bearing. The film of the fine amount component decline the conductivity similarly to the oxide film, and consequently, the time-passing resistance value goes up.

Such phenomenon is a problem common to conductive greases serving between relatively acting members.

As a measure against the phenomenon, it may be considered to use a base oil of high viscosity for securing an oil film and prevent the metal contact, but thickening of the oil film undesirably brings about lowering of the conductive capacity of the conductive grease.

The invention is to solve the problems of the conventional conductive grease as mentioned above, and accordingly it is an object of the invention to provide a conductive grease excellent in conductivity and less to cause a time-passing reduction in the conductivity.

Heat roller supporters or fixing parts of office machinery such as copiers, laser beam printer and others often become high temperatures as about 200° C. Therefore, the conductive grease to be used to the rolling bearing for such parts has been difficult to secure the enough conductivity over a long period of service, because a conductive grease using an ordinary lubricant as the base oil is insufficient in heat resistance.

Ordinarily, as the lubricant used as the base oil of the conductive grease, for example, mineral oil, poly-α-olefin oil, ether oil, or ester oil may be taken up, but applicably limiting temperatures of these base oils are 160° C. at the most.

Accordingly, rolling bearings to be served to such parts becoming high temperatures as mentioned above have still used a conductive brush to remove static electricity.

SUMMARY OF THE INVENTION

The invention is to solve the problems involved with the prior art, and it is an object to provide a rolling bearing displaying excellent in conductivity at from room temperature to high temperatures.

(1) A conductive grease comprising a base oil, a thickener, a conductive solid powder and at least one kind of a wear inhibitor, an extreme pressure agent and an oiliness agent, wherein an amount of the conductive solid powder added is 0.1 to 10 wt % based on a total weight of the grease, and a total amount of the at least one kind of a wear inhibitor, an extreme pressure agent and an oiliness agent added is 0.1 to 10 wt % based on a total weight of the grease.

(2) The conductive grease as set forth in Item (1), wherein the conductive solid powder is at least one kind of particle of which main component is fibrous carbon, metallic particle, metallic compound particle and carbon nanotube.

(3) The conductive grease as set forth in Item (2), wherein the particle of which main component is fibrous carbon is carbon black or acetylene black.

(4) The conductive grease as set forth in Item (3), wherein the thickener is a metallic soap or a urea compound, each addition amount thereof is 5 to 20 wt % based on a total weight of the grease, and a total amount of the thickener and the conductive solid powder is 5.1 to 20.1 wt % based on the total weight of the grease.

(5) The conductive grease as set forth in Item (1), wherein the wear inhibitor is at least one kind of orthophosphoric acid ester and phosphorous acid ester.

(6) The conductive grease as set forth in Item (1), wherein the extreme pressure agent is at least one kind of DTP (dithiophosphate) metallic compound or DTC (dithiocarbamate) metallic compound.

(7) The conductive grease as set forth in Item (1), wherein the oiliness agent is at least one kind of succinic acid ester, carboxylic acid anhydride, and alkenyl succinic acid anhydride.

(8) The conductive grease as set forth in Item (1) which further comprises fine particle of inorganic compound having an average diameter of 0.05 to 2 $\mu$m in an amount of 0.05 to 7 wt % based on a total weight of the grease.

(9) The conductive grease as set forth in Item (1), wherein the base oil is a single or a mixture of at least two kinds of mineral oil, synthetic hydrocarbon oil, ester oil, fluorine oil, ether oil and polyglycol oil, and kinematic viscosity thereof is 5 mm$^2$/s to 120 mm$^2$/s at 40° C.

(10) The conductive grease as set forth in Item (1), wherein the amount of the base oil added is 75 to 90 wt % based on the total weight of the grease.

(11) The conductive grease as set forth in Item (1), wherein the oil separation degree at 100° C. after 24 hours of the conductive grease is 0.5 to 2 wt %.

(12) The conductive grease as set forth in Item (11), wherein the amount of the conductive solid powder added is 0.2 to 0.9 wt % based on the total weight of the thickener and the conductive solid powder.

(13) The conductive grease as set forth in Item (1), wherein the thickener comprises a main component being at least one of silicone compound and fluorine compound, and the grease comprises carbon black as the conductive solid powder in an amount of 0.2 to 10 wt % based on the total weight of the grease.

(14) The conductive grease as set forth in Item (13), wherein the fluorine compound is polytetrafluoroethylene or ethylene trifluoride.

(15) The conductive grease as set forth in Item (13), wherein the silicone compound is fine powder silica, synthetic mica, mica, or smectite.

(16) The conductive grease as set forth in Item (13) which further comprises at least any one kind of the additives selected from the group consisting of nitrite, benzotriazol, MgO, Ca sulfonate, fluorophosphazen derivative, and MgS$_2$.

(17) The conductive grease as set forth in Item (13), wherein a specific surface area of carbon black is 250 m$^2$/g or more.

(18) The conductive grease as set forth in Item (13), wherein a DBP (dibutyl phthalate) oil supply amount of carbon black is 180 ml/100 g or more.

(19) The conductive grease as set forth in Item (13), wherein the base oil is a straight chain or side chain perfluoroalkylpolyether, perfluoroalkylpolyether introducing a carboxyl or isocyanate group into terminal group thereof, ester-modified or alcohol-modified perfluoroalkylpolyether, or a single or a mixture of at least two kinds of fluorine oil, silicone oil and fluorosilicone oil, and kinematic viscosity thereof is 15 mm$^2$/s to 500 mm$^2$/s at 40° C.

(20) The conductive grease as set forth in Item (2), wherein the conductive solid powder is carbon nano-tube having diameter of 1 to 24 nm and length of 0.5 to 30 µm.

(21) The conductive grease as set forth in Item (20) which further comprises, as conductive additive, particles having carbon of carbon black or acetylene lack being main components, metallic particles of gold, silver, copper, tin, zinc or aluminum, or metallic compound particles of silver oxide, niobium sulfide or silver nitrate.

(22) A rolling apparatus comprising an outer member, an inner member and a plurality of rolling elements rotatably arranged between the outer and inner members, and being packed with a conductive grease applied between the inner and outer members and the rolling elements, said conductive grease comprising a base oil, a thickener, a conductive solid powder, and at least one kind of a wear inhibitor, an extreme pressure agent and an oiliness agent, wherein an amount of the conductive solid powder added is 0.1 to 10 wt % based on the total weight of the grease, and a total amount of the at least one kind of a wear inhibitor, an extreme pressure agent and an oiliness agent added is contained 0.1 to 10 wt % based on the total weight of the grease.

(23) The rolling apparatus as set forth in Item (22) which further comprises a contacting seal between the outer member and the inner member, said seal being conductive.

(24) The rolling apparatus as set forth in Item (22), wherein the rolling apparatus is a rolling bearing, the outer member is an outer race, and the inner member is an inner race.

(25) The rolling apparatus as set forth in Item (22), wherein the rolling apparatus is a linear guide, the outer member is a slider, and the inner member is a guide rail.

(26) The rolling apparatus as set forth in Item (22), wherein the rolling apparatus is a ball screw, the outer member is a ball nut, and the inner member is a screw shaft.

Figure 1:
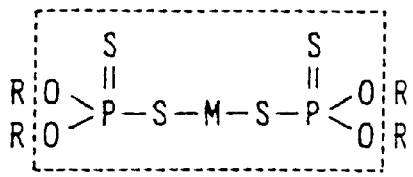
FIG. 1 is views showing chemical formulae of several kinds of additives.
Figure 1:
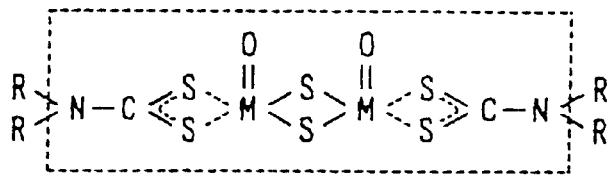
Figure 1:
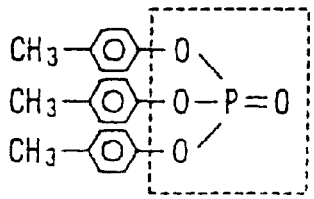
Figure 1:
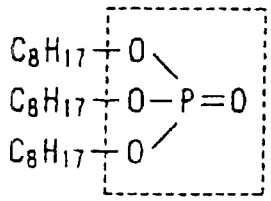
Figure 1:
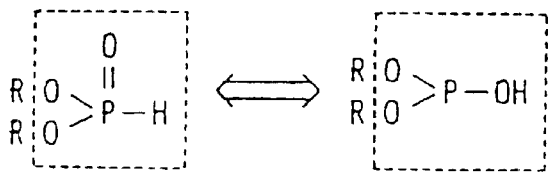

In the drawings, reference numeral 21 designates the ball bearing; 22 . . . the outer race; 22a . . . the raceway surface of the outer race; 23 . . . the inner race; 23a . . . the raceway surface of the inner race; 24 . . . balls; 27 . . . the conductive grease; 12 . . . the inner race; 13 . . . the outer race; 14 . . . the rolling elements; 15 . . . the holder; 17, 18 . . . the seal plates; 31 . . . the ball bearing; 32 . . . the outer race; 33 . . . the inner race; 34 . . . balls; and 37 . . . the conducive grease.

DETAILED DESCRIPTION OF THE INVENTION

The conductive grease having the constitutioin as mentioned in Item (1) is excellent in lubricity and can prevent the metal contact between members relatively acting each other like the raceway surface of the rolling bearing and the rolling elements, and the oxide film is difficult to appear on the raceway surface, and consequently the time-passing reduction in the conductivity is less to occur.

For restraining the time-passing reduction of the conductivity for a longer period of service, it is more preferable to determine the containing total amount of at least one kind of the wear inhibitor, the extreme pressure agent and the oiliness agent to be 0.5 to 7 wt % based on the total weight of the conductive grease.

Reference will be made to each of components contained in the conductive grease of the invention.

As the conductive solid powder to be added to the conductive grease of the invention, powder having the conductivity is suitably used, and the carbon black may be taken up as an example. The conventional conductive grease has been added with the carbon black as a thickener together with giving of the conductivity, while the conductive grease of the invention limits the addition amount of the conductive solid powder such as the carbon black, and at the same time inherent thickeners as lithium soap, calcium soap, aluminum soap, barium soap, lithium complex soap, barium complex soap, and urea compound are caused to co-exist in the conductive solid powder, so that it is possible to favorably maintain the conductive solid powder dispersed as a time passes. Generally used thickeners in greases may be employed without any difficulty.

In place of the carbon black, there may be particles having fibrous carbon such as acetylene black being main components, metallic particles of gold, silver, copper, tin, zinc or aluminum, metallic compound particles of silver oxide, niobium sulfide and silver nitrate, and carbon nanotube.

The amount of the conductive solid powder in the conductive grease of the invention should be 0.1 to 10 wt % based on the total weight of the grease. Being less than 0.1 wt %, the conductivity of the conductive grease is short. Being more than 10 wt %, the grease probably decreases the capacity, and the penetration is made small to harden the conductive grease, and when packed into the bearing, a bearing torque is large. For enough conductivity to the conductive grease, the conductive solid powder is preferably 1 wt % or more, and accordingly, more preferable is 1 to 10 wt % based on the total weight of the grease.

In the conductive grease having the constitution as mentioned in Items (2) and (20), since the carbon nano-tube has a nature imparting the conductivity, the conductive grease comprising the carbon nano-tube has accordingly an excellent conductivity. In addition, the carbon nano-tube has also a nature imparting lubricity, and so the conductive grease is excellent in the lubricity. Being excellent in the lubricity, for the reason as mentioned above, it is possible to avoid the metal contact between the mutual members relatively moving each other as the raceway surface and the rolling elements of the rolling bearing, so that the oxide film or films of other components are difficult to appear on the raceway surface, and consequently the time-passing reduction in the conductivity is less to occur.

Figure 15A:
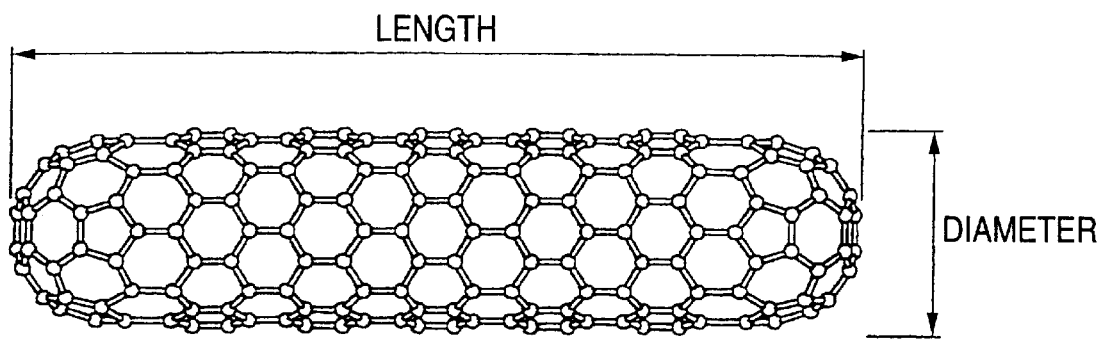
FIG. 15A and FIG. 15B are conceptual views showing structures of carbon nano-tubes.
Figure 15B:
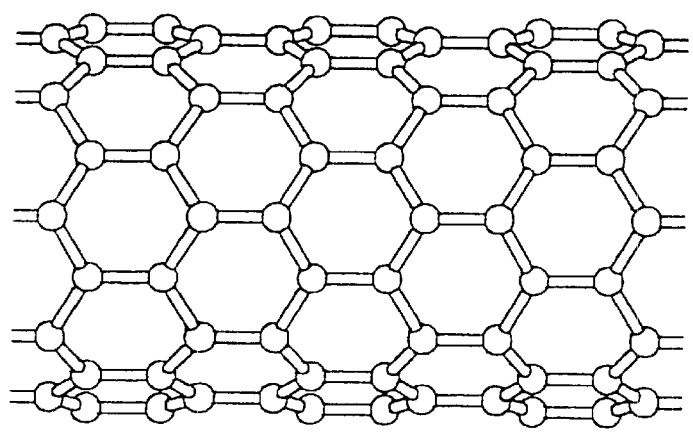

Now, the carbon nano-tube will be explained. The carbon nano-tube is a compound having a structure as shown in FIG. 15A, and mainly network structures (see FIG. 15B) of 6-membered carbon ring are rounded to be tubular carbon polyhedron (terminals are closed). At parts of connecting tubes of different diameters or terminal closed parts, 5-membered or 7-membered carbon rings are often seen. Those of carbon nano-tubes having spherical structure, for example, $C_{60}$ or $C_{70}$ are known as fullerene.

The carbon nano-tube is that carbon and carbon are combined by $sp^2$ hybrid orbital similarly to graphite, and a slender shape differently from diamond structures, so that it is slidable and firm. By using the carbon nano-tube having such nature as the conductive additives, it is possible to give the grease a desirable conductivity and lubricity.

It is preferable that the amount of the carbon nano-tube in the conductive grease of the invention is 0.1 to 10 wt % based on the total weight of the conductive grease. Being less than 0.1 wt %, the conductivity of the conductive grease is short, and the lubricity also lacks to easily cause the time-passing decrease of the conductivity. Being more than 10 wt %, the grease probably decreases the capacity (bad lubrication such as separation of the base oil and the carbon nano-tube), and the penetration is made small to harden the conductive grease, and when packed into the bearing, a bearing torque is large. For imparting enough conductivity to the conductive grease, the carbon nano-tube is preferably 0.5 wt % or more, and accordingly, more preferable is 0.5 to 10 wt % based on the total weight of the grease.

In a range so far as not spoiling the object of the invention, other ordinary conductive additives may be mixed in the carbon nano-tube. As available conductive additive, there may be, for example, particles having carbons of carbon black or acetylene black being main components, metallic particles of gold, silver, copper, tin, zinc or aluminum, and metallic compound particles of silver oxide, niobium sulfide or silver nitrate.

To the conductive grease of the invention, if desired, the thickener may be used in combination. Using in combination, it is possible to maintain dispersion of the carbon nano-tube favorable as a time passes. As the thickener, ordinarily used thickeners in greases, e.g., lithium soap, calcium soap, aluminum soap, barium soap, barium complex soap, lithium complex soap, or urea compound may be served without any problems. Further, when using fluorine oil as a base oil as mentioned below, fluorine compound such as polytetrafluoroethylene may be used as the thickener.

The amount of the thickener is preferably 5 to 20 wt % based on the total weight of the grease. If it is less than 5 wt %, the grease within the bearing is easy to leak out, and if it is more than 20 wt %, the torque is large.

From the viewpoint of the lubricity and fluidity of the conductive grease, the total amount of the thickener and the conductive solid powder is preferably 5.1 to 20.1 wt % based on the total weight of the grease.

Further, to the conductive grease of the invention, preferably at least one kind is added of a wear inhibitor, an extreme pressure agent, an oiliness agent, and antioxidant. If adding the additives effective to prevent abrasion, it is possible to avoid the metal contact between the mutual members relatively moving each other as the raceway surface and the rolling elements of the rolling bearing, so that the time-passing decrease of the conductivity for a long period of service.

A compounding ratio of the base oil and the thickener in the conductive grease is sufficient with the penetration suitable to usage and using temperatures of the rolling bearing, not specially limiting, but ordinarily selecting ranges of the penetration Nos. 1 to 3 defined by JIS K2220-1999.

The above-mentioned rolling bearing displays a long period stability also at high temperatures as 180° C. or higher.

Functional groups of these additives have adsorbing function to metals fabricating the raceway surfaces, and so the above-mentioned additives are adsorbed thereto. Owing to this fact, the lubricity is heightened, and fine injures by the metal contact in the raceway surfaces or the like are prevented to exhibit the effect of maintaining the conductivity.

As the wear inhibitors to be added to the conductive grease having constitution as mentioned in the above Item (1), organic phosphorus based compounds will be enumerated. For example, there are orthophosphoric acid ester (TCP, TOP) represented by a general formula $(RO)_3PO$, phosphorous acid ester such as phosphorous acid diester represented by a general formula $(RO)_2P(O)H$ or phosphorous acid triester represented by a general formula $(RO)_3P$, and the like. The above-mentioned "R" represents alkyl group, aryl group and alkylaryl group.

As the extreme pressure agents, there are DTP metallic compounds such as Zn-DTP (zinc dithiophosphate) or Mo-DTP (molybdenum dithiophosphate), DTC metallic compounds such as Ni-DTC or Mo-DTC, or organic metallic compounds containing sulfur, phosphorus or chlorine.

Further, as the oiliness agents, taken up are amine based compounds, organic fatty acid compounds such as oleic acid or succinic acid ester, carboxylic acid anhydride such as alkenyl succinic acid anhydride, and the like.

As to antioxidant being an optional compound, those used to conventional greases may be served without any problems. Examples thereof are amine compounds such as aliphatic amine or phenol-based group aromatic amine, specifically dioctyldiphenylamine.

Among them, FIG. 1 shows chemical formulae of phosphorous acid ester, TCP, TOP and DTP metallic compounds, and DTC metallic compounds. Functional groups other than R in the formulae (functional groups encircled with dash lines in FIG. 1) are have adsorbing function to metals fabricating the raceway surfaces, and so the above-mentioned compounds are adsorbed thereto. Owing to this fact, the lubricity is heightened, and fine injures by the metal contact in the raceway surfaces are prevented to exhibit the effect maintaining the conductivity.

The functional groups other than the functional groups encircled with dash lines in FIG. 1 and having the above mentioned effects are, for example, functional groups contained in organic fatty acid compounds of oleic acid, succinic acid ester or their derivatives, or carboxylic acid anhydride such as alkenyl succinic acid anhydride as the oiliness agent, that is, carboxylic group or acid anhydride group.

In the conductive grease of the invention, it is necessary to add the above-mentioned additive, in short, at least one kind of the wear inhibitor, the extreme pressure agent, and the oiliness agent in an amount of 0.1 to 10 wt % based on the total weight of the grease. If being less than 0.1 wt %, an effect of preventing the conductivity from the time-passing decline is insufficient, while if adding more than 10 wt %, bad influences such as the conductivity lowering or corrosion (corrosion in the metal parts as the raceway surface) might be probably affected. For restraining the time-passing decline of the conductivity for a longer serving period, preferable is 0.5 to 7 wt % based on the total weight of the grease.

The wear inhibitor and the oiliness agent are preferably used in combination for restraining the time-passing decline of the conductivity for the longer period. For example, if using phosphorous acid ester as the wear inhibitor and carboxylic acid anhydride as the oiliness agent, the effect avoiding the time-passing decline of the conductivity is especially superior.

Further, by adding fine particles of inorganic compound to the grease of the constitution of the above Item (1), even if an oxide film appears on the raceway surfaces of the bearing or the surfaces of the rolling elements, or organic materials owing to decomposition of the grease are adsorbed and solidified thereon, since the raceway surface or the surface of the rolling element are ground at micro-degree by the fine particles of the inorganic compounds, new surfaces always are exposed, and electric resistance values are maintained low for a long period of time.

Kinds of of the inorganic compounds are not specially limited as far as they can grind at micro-degree oxide films appearing on the metal surfaces or organic materials adhered thereon.

Specific examples are metallic oxides such as $SiO_2$, $Al_2O_3$, MgO, PZT or $TiO_2$, clay minerals such as smectite or mica, metallic nitrides such as $Si_3N_4$, or ZrN, and metallic carbides such as SiC or TiC.

Diameters of fine particles of inorganic compounds should be sizes of not hindering as the grease composition for the rolling bearing, and in general, if exceeding 2 μm, they act as foreigners, and so they should be 2 μm or less.

If the addition amount is too small, the effect of restraining the formation of the oxide film, and being too much, a cause for increasing wear, and preferable is 0.05 to 7 wt % based on the total weight of the grease.

As the base oil to be used to the conductive grease of the invention, there are mineral oil, synthetic hydrocarbon oil such as poly-α-olefin oil (PAO), ester oil, silicone oil, fluorine oil, ether oil, or polyglycol oil, and they may be a single or a mixture of two kinds or more.

Since the base oil, if the viscosity is too large, gives bad influences to the conductivity, the kinematic viscosity at 40° C. is preferably 120 mm$^2$/sec or less, more preferably 100 mm$^2$/sec or less. Exceeding 120 mm$^2$/sec, the oil film is comparatively thick to increase the resistance value. If the kinematic viscosity is less than 5 mm$^2$/sec, it is not suitable from problems of loss of evaporation or lubricity. If the viscosity of the base oil is too low, it is difficult to form a lubricant oil film sufficient to avoid the metal contact between the raceway surfaces and the rolling elements, e.g., during rotation of the bearing. For making the above effect better, it is especially desirable that the kinematic viscosity of the base oil at 40° C. is 15 to 60 mm$^2$/sec.

As the amount of the base oil in the conductive grease is a portion of the total amount of the conductivity grease minus (−) the conductive solid powder, the wear inhibitor, the extreme pressure agent, the oiliness agent, the thickener, the antioxidant and the like, it is preferable that the base oil is 75 to 90 wt % based on the total weight of the grease.

For packing the conductive grease into the bearing, a conductive seal plate formed of a conductive rubber or the like may be used in combination, and if giving the conductivity to the seal plate, it is possible to restrain the time-passing decrease of the conductivity.

The compounding ratio of the base oil and the thickener in the conductive grease of the invention is sufficient with the penetration suitable to usage and using temperatures of the rolling bearing, not specially limiting, but preferably selecting ranges of the penetration Nos. 1 to 3 defined by JIS K2220-1999.

If having the constitution as mentioned in the Item (11), a wasteful oil film is checked to a minimum, and the conductivity of the conductive grease may be kept stable for a long period of time, enabling to exactly remove influences by the static electricity for a long term and to heighten reliability accordingly. Herein, if the oil separation degree exceeds 2%, the base oil much separates during rotation of the inner race, and the base oil becomes rich at the raceway surfaces or the grooves of the inner and outer races. As a result, the carbon black in the oil content exists locally to accelerate destruction of chain structures and advance to decrease the conductivity. On the other hand, if the oil separation degree at 100° C. after 24 hours is less than 0.5%, bad lubrication is extreme to shorten the service life of the bearing. Accordingly, the oil separation degree of the conductive grease is desirable between 2% or less and 0.5% or more.

By checking the oil separation degree at 100° C. after 24 hours of the conductive grease to be relatively low, grease leakage or oil scatter can be restrained, so that bad influences are not affected to resin materials to be used to the neighborhoods of the bearing of information equipment such as office machinery. Besides, as the conventional conductive grease, the only carbon black may be used as the thickener, but if making lithium soap or urea compound being inherent thickener (in case of using fluorine oil, polytetrafluoroethylene) co-exist with the carbon black, dispersion of the carbon black can be kept well conditioned as the time passes, and the oil separation may be controlled.

The viscosity of the base oil of the conductive grease having the constitution as mentioned in the above Item (11) is provided with no special suppression, but if the kinematic viscosity of the base oil exceeds 100 mm$^2$/s, the oil film is relatively thick and electric resistance between the inner and outer races can not be kept at appropriate values. If it becomes less than 5 mm$^2$/s, it is not suitable from the problems of loss of evaporation or lubricity, and it is desirably that the viscosity of the base oil is 5 to 200 m$^2$/s, preferably 15 to 100 m$^2$/s.

With respect to the amount of the conductive fine particle, if the total amount of the conductive fine particle and the thickener is 1, a ratio is desirably 0.2 to 0.9.

If a constitution is as the above mentioned Item (13), the rolling bearing is excellent in the conductivity at high temperatures as 180° C. or higher and the conductive state between the inner and outer races is maintained well conditioned.

As the base oil, enumerated are perfluoroalkylpolyether (a straight chain or side chain); perfluoroalkylpolyether introducing a carboxyl or isocyanate group into terminal group thereof; ester-modified or alcohol-modified perfluoroalkylpolyether; fluorine oil such as fluorophosphazen oil; silicone oil such as methylphenyl silicon, dimethyl silicon and fluorosilicone oil. These substances may be used in a single or in a mixture of two kinds or more.

The viscosity of the base oil is provided with no special limit, but the kinematic viscosity at 40° C. is appropriately 500 mm$^2$/s or less. If being more than 500 mm$^2$/s, the oil film becomes relatively thick between the raceway surfaces and the rolling elements of the rolling bearing even at high temperature, and the proper conductivity cannot be kept. But if it is less than 15 mm$^2$/s, the lubricity is insufficient.

The fluorine compound of the thickener is fluorine resin such as polytetrafluoroethylene or ethylene trifluoride. The silicon compound is fine powder silica or synthetic mica (fluorine tetra silicon mica), i.e., layer-like compound (clay mineral) having solid lubricating capacity such as mica, smectite.

Only the fluorine compound or the silicon compound is not used as the thickener, but if limiting the amount and causing the carbon black to co-exist with the thickener, the dispersion of the carbon black can be maintained well conditioned as the time passes.

So far as not hindering the object of the invention, a known thickener may be used in combination with the above-mentioned thickener. Known thickeners are, for example, Li soap, silica, Ca soap, Al soap, Li complex soap, Al complex soap, Ca complex soap, polyurea, bentonite.

The addition amount of the carbon black being the conductive additive should be 0.2 to 10 wt % basen on the total weight of the conductive grease. Being less than 0.2 wt %, an enough conductivity is not available, and being more than 10 wt %, the worked penetration of the conductive grease becomes too large (the conductive grease becomes too hard). Kinds of the carbon black are not limited, preferable is to be rich in oil absorption from the viewpoint of the dispersion. It is preferable to use such a carbon black having a large specific surface area (desirably, 250 m$^2$/g or more) and lipophilic property.

Available wear inhibitor, extreme pressure agent, and oiliness agent are limited because of the heat resistance or compatibility with the thickener (fluorine compound, silicon compound), but for example, if the above mentioned fluorine oil is used as the base oil, the followings are usable. As the oiliness agent, there are amine based compound, organic fatty acid compound such as oleic acid, succinic acid ester and the like.

Other than these additives, solid lubricant such as nitrite, benzotriazole.MgO, Ca sulfonate, fluorophosphazen derivative, layer-like compounds such as mica, or $MoS_2$. Since they are poor in concordance and solubility with the fluorine oil, use of 10 wt % or higher, based on the total weight of the grease, is not so effective as their amounts.

If arranging a contacting seal composed of the conductive rubber containing the carbon black or the like between the inner and outer races in the inventive rolling bearing, the conductivity can be more preferably heightened.

The embodiment of the conductive grease according to the invention will be explained in detail with reference to the attached drawings.

Figure 2:
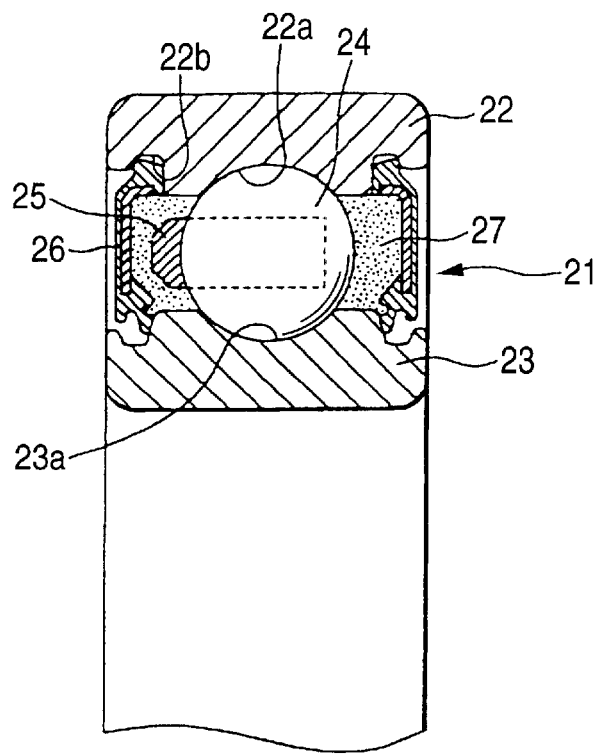
FIG. 2 is a cross sectional view showing a structure of a ball bearing applied with the conductive grease of the invention.

FIG. 2 is a cross sectional view showing the structure of the ball bearing 21 having the conductive grease of the invention. A ball bearing 21 comprises an outer race 22, an inner race 23, a plurality balls 24 rotatably arranged between the outer race 22 and the inner race 23, a cage (holder) 25 holding the plural balls 24, and contacting seals 26, 26 furnished in sealing grooves 22b of the outer race 22. A space defined by the outer race 22, the inner race 23, and the seals 26, 26 encircling is packed with the conductive grease 27, and the grease is sealed within the ball bearing 21 by the seals 26.

Contacting faces between raceway surfaces 22a, 23a of both races 22, 23 and balls 24 are lubricated by the conductive grease 27, while the outer race 22, the inner race 23 and the balls 24 are conductive. Further, the outer race 22 or the inner race 23 is grounded (not shown) so as to cancel static electricity generated by rotation of the ball bearing 21.

As the conductive grease 27, the poly-α-olefin oil (the kinematic viscosity at 40° C. is 30.0 mm²/sec) is used as the base oil, to which 7 wt %, based on the total weight of the grease, of lithium soap as the thickener, 5.0 wt %, based on the total weight of the grease, of carbon black as the conductive additive and 5.0 wt %, based on the total weight of the grease, of phosphorous acid ester as the wear inhibitor may be added respectively (the rest being the base oil).

The conductive grease 27 has the excellent lubricity together with the conductivity, so that the metal contact between the raceway surfaces 22a, 23a of the ball bearing 21 and the balls 24 is less to occur, and oxide film does not appear on the raceway surfaces 22a, 23a, and consequently the time-passing lowering of the conductivity is difficult to arise.

As the conductive grease 27, the ester oil (the kinematic viscosity at 40° C. is 26 mm²/sec) is used as the base oil, to which lithium soap as the thickener, carbon nano-tune (5.0 wt % based on the total weight of the grease) as the conductive additive, and succinic acid anhydride (2.5 wt % based on the total weight of the grease) are added respectively, so that the worked penetration is made 249.

The conductive grease 27 comprises carbon nano-tube and has the excellent lubricity together with the conductivity, so that the metal contact between the raceway surfaces 22a, 23a of the ball bearing 21 and the balls 24 is less to occur, and oxide film does not appear on the raceway surfaces 22a, 23a, and consequently the time-passing lowering of the conductivity is difficult to arise.

The seal 26 is composed of a conductive rubber to provide the conductivity, and it is possible to more suppress the time-passing lowering of the conductivity.

Thus, such a conductive grease 27 exhibits remarkable usefulness as the measure to prevent the static electricity of the rolling bearing to be used to office machinery such as copiers, laser printers and the like.

The instant embodiment is an example of the invention, and not limited thereto.

For example, the instant embodiment is the example of applying the conductive grease to the ball bearing, but the conductive grease of the invention is not limited to a particular usage, but is applicable to other usage requiring the conductivity as greases for electric contact points.

As mentioned above, the lowering of the conductivity is generated in that a plurality of members perform the relative movement to create oxide films in the raceway surfaces of these members, and an extent of forming the oil film between the members during the relative movement has a close relation with the lowering the conductivity.

Accordingly, the conductive grease of the invention is especially used to the rolling apparatus having members doing the relative movement such as the rolling bearing, ball screw, linear guide or linear ball bearing.

Figure 25:
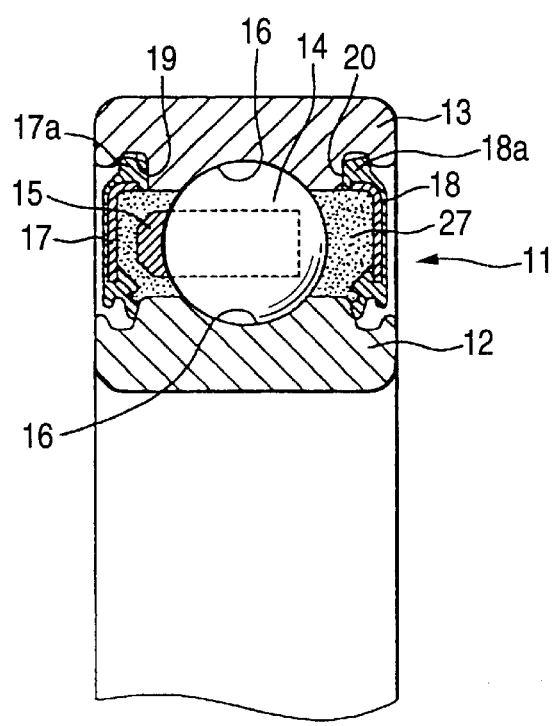
FIG. 25 is a cross sectional view showing one embodiment of the rolling bearing according to the invention.

FIG. 25 is a cross sectional view showing a structure of a rolling bearing relating to another embodiment of the invention. In the same, the rolling bearing 11 has an inner race 12 secured outside on a shaft to be supported (for example, a drum shaft of a transferring drum) and an outer race 13 furnished on an outer periphery of the inner race 12. Both inner and outer races 12, 13 are fabricated with metal materials of bearing steels, and one of them is grounded.

The rolling bearing 11 has a plurality of balls (rolling elements) 14 rotatably arranged between the inner race 12 and the outer race 13, and a cage 15 holding the rolling elements 14. In a central part of the outer circumference of the inner race 12 and in a central part of the inner circumference of the outer race 13, rolling grooves 16 of the rolling elements defining the raceway surfaces of the rolling elements 14 are formed over the full circumferences. In addition, the rolling bearing 11 has ring-shaped seal plates 17, 18 for sealing spaces the inner and outer races 12, 13.

The sealing plates 17, 18 are made of a conductive material such as a conductive rubber, and are formed on the outer circumferences with fitting parts 17a, 18a for detachably fitting into grooves 19, 20 holding the seal plates formed in the inner circumference of the outer race 13.

In a closed space sectioned with the seal plates 19, 20, the rolling elements 14 and the inner and outer races 12, 13, the conductive grease 27 is charged. For the conductive grease 27, the poly-α-olefin oil (the kinematic viscosity at 40° C. is 30.0 mm²/sec) is used as the base oil, to which lithium soap (7 wt % based on the total weight of the grease) as the thickener, and carbon black (5.0 wt % based on the total weight of the grease) as the conductive fine powder are added respectively to be the oil separation degree at 100° C. after 24 hours being 2% or less specified by JIS K2200-1999 5.7.

If specifying the oil separation degree of the conductive grease 27 to be filled within the rolling bearing 11 to be 2% or less, a wasteful oil film can be controlled to a minimum, and the conductivity of the conductive grease 27 is maintained stable for a long term. By checking the oil separation degree of the conductive grease 27 to be relatively low, grease leakage or oil scatter can be restrained, so that bad influences are not affected to resin materials to be used to the neighborhoods of the bearing of information equipment such as office machinery.

Figure 30:
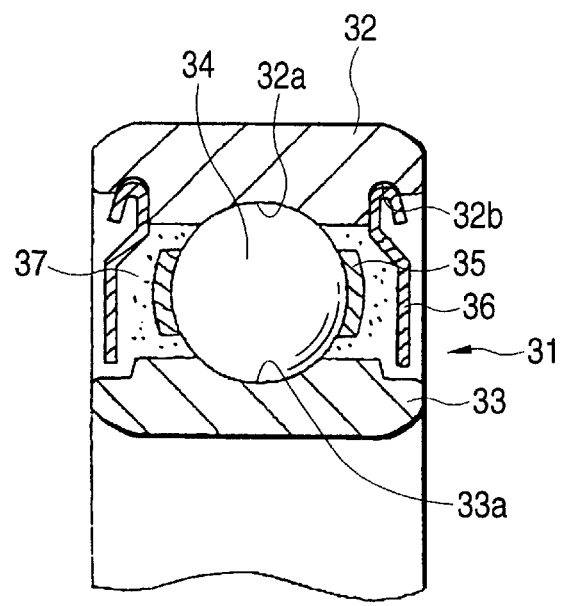
FIG. 30 is a cross sectional view showing a structure of the ball bearing being one embodiment of the rolling bearing of the invention.

FIG. 30 is a vertically cross sectional view showing the structure of a ball bearing 31 of another embodiment relating to the invention.

A ball bearing 31 comprises an outer race 32, an inner race 33, a plurality balls 34 rotatably arranged between the outer race 32 and the inner race 33, a cage (holder) 35 holding the plural balls 34, and seals 36, 36.

The seals 36 are attached to sealing grooves 32b of the outer race 32, and lip portions thereof make a sliding contact with the outer circumference of the inner race 33.

A space defined by the outer race 32, the inner race 33, and the seals 36, 36 encircling is charged with the conductive grease 37, and the grease is sealed within the ball bearing 31 by the seals 36, 36.

Contacting faces between raceway surfaces 32a, 33a of both races 32, 33 and balls 34 are lubricated by the conductive grease 37, while the outer race 32, the inner race 33 and the balls 34 are conductive. Further, the outer race 32 or the inner race 33 is grounded (not shown) so as to cancel static electricity generated by rotation of the ball bearing 31.

In the conductive grease 37, perfluoropolyether is the base oil, polytetrafluoroethylene (PTFE) is the thickener, and carbon black is the conductive additive (0.2 to 10 wt % based on the total weight of the conductive grease) The resulting grease has the conductivity. Kinds of the base oil and the thickener are not limited to the above mentioned but appropriately changeable. For example, the thickener may be silicon compound.

Such a conductive grease 37 has excellent lubricity together with the conductivity, so that the metal contact between the raceway surfaces 32a, 33a of the ball bearing 31 and the balls 34 thereof is less to occur, and oxide film does not appear on the raceway surfaces 32a, 33a, and consequently the time-passing lowering of the conductivity is difficult to arise. Further, as fluorine compound as PTFE is added as the thickener, heat resistance of the conductive grease 37 is high, enabling to maintain the excellent conductivity at high temperatures for a long term.

In the ball bearing 31, the conductivity between both races 32, 33 is well conditioned to be less to generate electrification, and such a condition is maintained for a long period of time. In particular, the conductivity is superior even at high temperatures as 180° C. or higher for a long term.

As the ball bearing 31 is difficult to electrify, such probability is small that radiation noises of the static electricity occurs to affect bad influences to machinery using the ball bearing 31. Thus, this ball bearing can be suitably served to office machinery as copiers, laser beam printer, information equipment as hard disk drive, and other motors.

The instant embodiment is an example of the invention, and not limited thereto.

For example, in the instant embodiment, as the rolling bearing, a deep groove ball bearing is exemplified, but the rolling bearing of the invention may be applied to other various rolling bearings, for example, radial type rolling bearings such as cylindrical roller bearing, tapered roller bearing, angular contact ball bearing, or thrust type rolling bearing such as thrust ball bearing, thrust roller bearing.

Next, with respect to several kinds of ball bearings having substantially similar structures to the above mentioned ball bearing 21, explanation will be made to results of measuring resistance values of the inner and outer races during rotation, and evaluating the relation between the rotational speed and the conductivity, and degrees that the conductivity became changed as the time passed.

An apparatus for measuring resistance values will be explained with reference to FIG. 3.

In the same, numeral 1 designates the ball bearing (also called as the rolling bearing) to be measured, a shaft member 2 attached to the inner race 1a is driven by a motor 3 to rotate the bearing 1. A predetermined constant voltage is applied by a constant voltage source 4 between the shaft member 2 combined with the inner race 1a and the outer race 1b, and a resistance measuring apparatus 5 is connected in parallel with the constant voltage source 4.

A resistance measuring apparatus 5 outputs measured voltage values (analog values) to A/D conversion circuit 6 which converts the voltage values from the resistance measuring apparatus 5 into digital values at predetermined sampling period, and outputs the converted digital signal to an arithmetic processing unit 7. In this embodiment, the sampling period of A/D conversion circuit 6 is set to be 50 kHz (sampling time interval=0.02 ms).

The arithmetic processing unit 7 comprises a maximum resistance calculating part 7A, a threshold value processing part 7B, and a wave number counting part 7C. The maximum resistance calculating part 7A calculates the maximum resistance value in accordance with the input digital signal. The threshold value processing part 7B processes threshold values at the predetermined threshold value in regard to the input digital signal so as to cancel noises. The wave number counting part 7C counts changing number, in short, wave number of wave mountains per each fixed time unit by changes in increase and decrease of time-passing pulse values with respect to the pulse count from the threshold value processing part 7B in order to demand average values of the wave number per each fixed time unit. The arithmetic processing unit 7 outputs to a display unit 8 the demanded maximum resistance value and the average value of the wave number per each fixed time unit.

This embodiment determines the unit time counting the wave number to be 0.328 seconds.

The display unit 8 constituted from a display, or the like shows the maximum resistance value and the average values of the wave number per unit time demanded by the arithmetic processing unit 7.

Further reference will be made to a method of evaluating resistance values between the inner race and the outer race of the ball bearing 1 employing the apparatus of the above-mentioned structure.

Under the condition where the motor 3 drives to rotate the shaft member 2, i.e., the inner race 1a at the predetermined rotational speed, desired constant voltage is applied between the inner and outer races 1a, 1b of the bearing 1 from the constant voltage source 4. At this time, current flows between the inner and outer races 1a, 1b, but voltage is fluctuated by spark. This voltage is measured by the resistance measuring apparatus 5, and subsequently converted into the digital value by A/D conversion circuit 6, and in accordance with the digital signal, the arithmetic processing unit 7 demands the maximum resistance value and the wave number per predetermined unit time for showing in the display unit 8.

Eight kinds of bearings (Examples 1, 2, Reference example 1, and Comparative examples 1 to 5) with respectively different kinds of greases were prepared, and the apparatus of the above mentioned structure measured the resistance value (maximum value) between the inner and outer races 1a, 1b per 100 hours as to each of the bearings.

Each of the eight kinds of the bearings is the ball bearing having the 8 mm inner diameter, the 22 mm outer diameter and the 7 mm width. The eight kinds of greases have the compositions as shown in Tables 1 and 2, and the packing amounts are 155 to 165 mg.

The used carbon nano-tubes are 1 to 3 nm in diameter and 0.5 to 5 μm in length (as to the diameter and the length, see FIG. 15A).

TABLE 1

|  |  | Ex. 1 | Com. 1 | Com. 2 | Com. 3 |
|---|---|---|---|---|---|
| Thickener | Kind | Lithium soap | Lithium soap | Lithium soap | Lithium soap |
|  | Amount | 7 wt % | 12 wt % | 7 wt % | 12 wt % |
| Base oil | Kind | PAO[2] | PAO[2] | PAO[2] | PAO[2] |
|  | Viscosity[1] | 30.0 | 30.0 | 30.0 | 30.0 |
| Conductive solid powder | Kind | Carbon black | None | Carbon black | None |
|  | Amount | 5.0 wt % | 0 wt % | 5.0 wt % | 0 wt % |
| Wear inhibitor | Kind | Phosphorous acid ester[3] | Phosphorous acid ester[3] | None | None |
|  | Amount | 5.0 wt % | 5.0 wt % | 0 wt % | 0 wt % |
| Worked penetration |  | 249 | 245 | 245 | 250 |
| Volume resistivity ($\Omega \cdot cm$) |  | $7 \times 10^3$ | $8 \times 10^2$ | $9 \times 10^3$ | $1 \times 10^{12}$ |

Ex.: Example
Com.: Comparative Example
[1] Kinematic viscosity of the base oil at 40° C., the unit is $mm^2/sec$
[2] PAO: Poly-α-olefin oil
[3] Phosphorous acid ester compound: $(C_{24}H_{49}O)_2P(O)H$ The measuring conditions of the Example 1 and the Comparative examples 1 to 3 are as follows.
Rotational speed of the shaft member 2: 150 rpm ($min^{-1}$)
Radial load (Fr) given to the bearing 1: 19.6N
Rotating time: 500 hours
Applied voltage: 6.2V
Maximum current: 100 μA
Atmospheric temperature: 25° C.
Atmospheric humidity: 50% RH
Sampling period: 50 kHz, 0.328 seconds.

Figure 4:
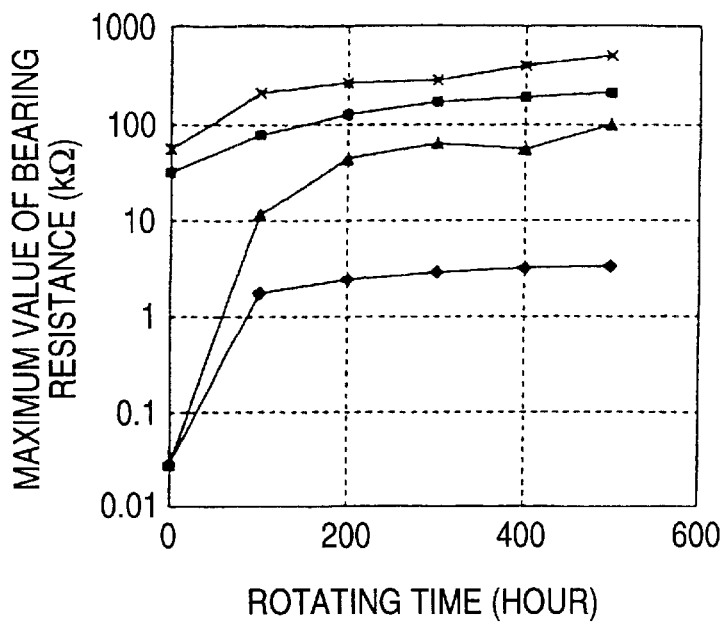
FIG. 4 is a graph showing the relationship between rotating times of the ball bearing and maximum values of bearing resistance.

Next, FIG. 4 shows results in a graph for studying the contents thereof. In the graph of the same, the results of the Example 1 are shown with diamond marks (♦), those of Comparative example 1 are shown with square marks (■), those of the Comparative example 2 are shown with triangle marks (▲), and those of Comparative example 3 are shown with cross marks (×).

The Example 1 and the Comparative example 2 are the bearings furnished with the conductive grease containing carbon black, and those are, as shown, low in the initial resistance values, because of containing the carbon black thereby to reduce volume resistivity (see Table 1). But the Comparative example 2 containing the carbon black not containing the wear inhibitor increases the resistance value as the time passed.

The Comparative examples 1 and 3 using the grease without containing the carbon black have the high resistance values since the initial period. Such bearings induce radiation noises, and in case of being applied to copiers or printers, they have probability of affecting bad influences such as distortions to copied or printed images.

The grease of the Example 1 contains 5 wt %, based on the total weight of the grease, of the carbon black and 7 wt %, based on the total weight of the grease, of the thickener, the total amount being 12 wt % based on the total weight of the grease. As combinations of containing amounts for providing a penetration and a lubricity substantially equivalent to said grease, such cases may be assumed of the carbon black and the thickener being 1 wt % and 11 wt %, 3 wt % and 9 wt %, or 7 wt % and 3 wt %, respectively (the base oil is more as to the content of 2 wt %), each based on the total weight of the grease.

Figure 5:
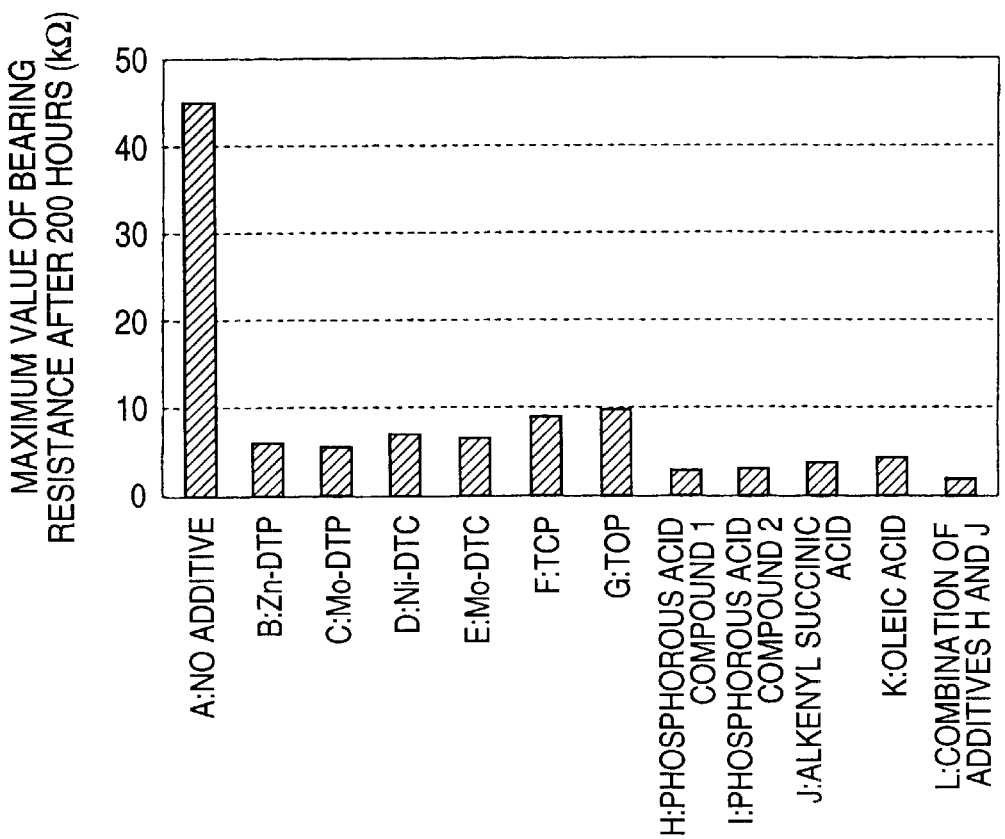
FIG. 5 is a graph showing maximum values of the bearing resistance depending on kinds of additives in the grease.

In the bearings of the Example 1, next explanation will be made, referring to FIG. 5, to results of resistance values (maximum value) measured using greases changing the wear inhibitors to other kinds of additives (extreme pressure agent or the oiliness agent). The resistance values of FIG. 5 are those after rotation for 200 hours. The addition amount of each of additives was 5.0 wt % based on the total weight of the grease.

A mark "A" in the same is a case of adding no additive, marks "B to G" are cases of adding the extreme pressure agent, "H and I" are of adding the wear inhibitors, "J and K" are cases of adding the oiliness agents, and "L" is a case of adding both additions of the wear inhibitor of "H" and the oiliness agent of "J".

"A" without additive was very large in the resistance value after 200 hours, while "B to L" with additives were remarkable in the effects of suppressing the resistance values from heightening, irrespective of any additives.

Among them, the cases of adding the phosphorus based wear inhibitors (H and I) have the large effect of checking the time-passing changes in the resistance value, and further the case (L) of mixing the phosphorus based wear inhibitors and the oiliness agent could by far control the time-passing changes in the resistance value.

Concluding the results of FIG. 5, the degrees of above mentioned effects are superior in order of the combination of the wear inhibitor and the oiliness agent, the wear inhibitor, the oiliness agent and the extreme pressure agent, and in particular, the combination of the wear inhibitor and the oiliness agent and the wear inhibitor are excellent.

Figure 6:
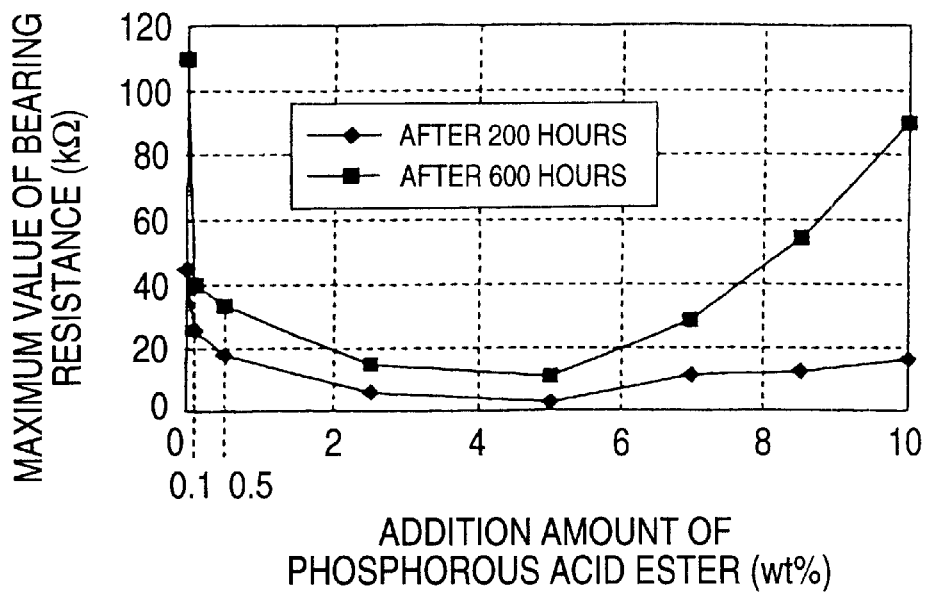
FIG. 6 is a graph showing the relationship between the addition amount of phosphorous acid ester and the maximum values of the bearing resistance.
Figure 7:
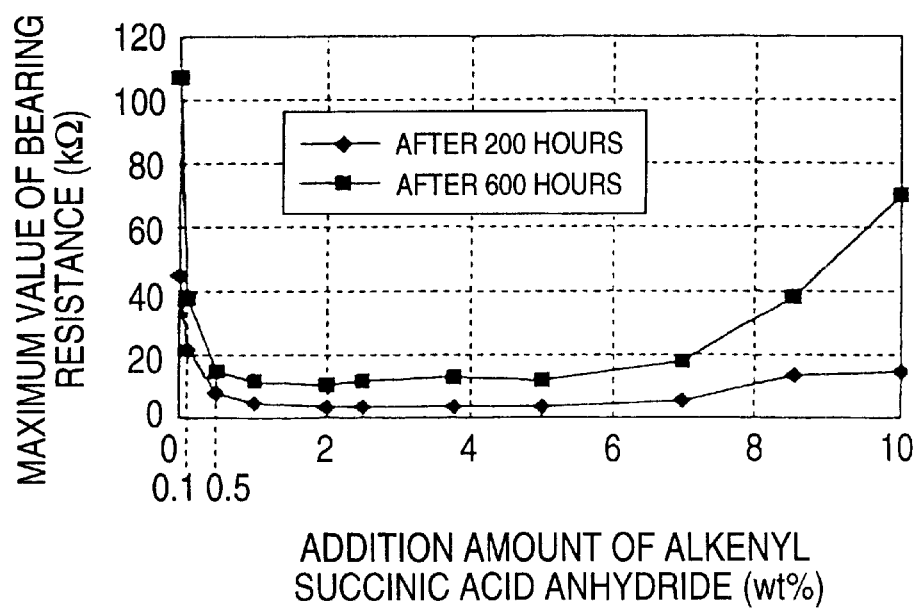
FIG. 7 is a graph showing the relationship between the addition amount of alkenyl succinic acid anhydride and the maximum values of the bearing resistance.
Figure 8:
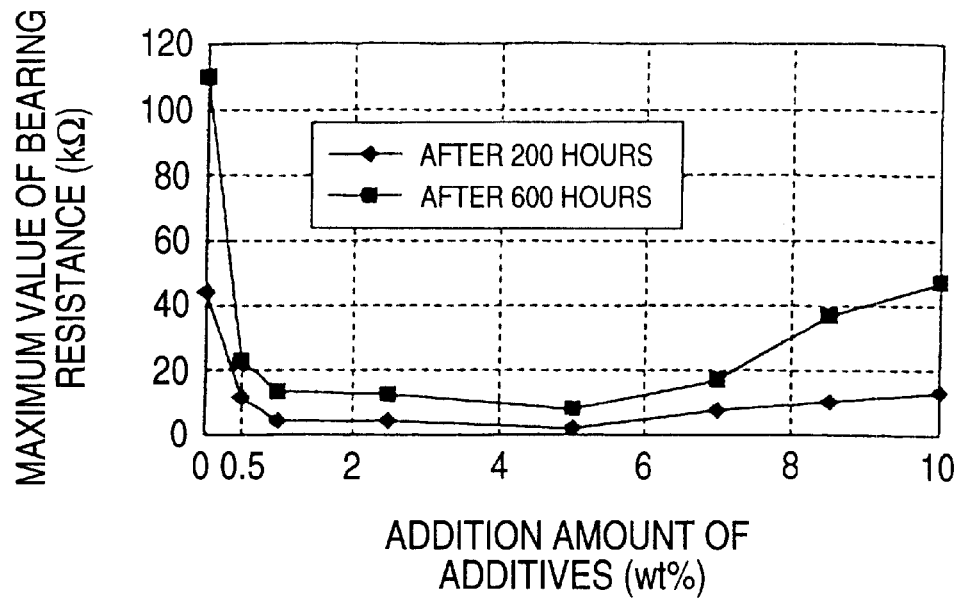
FIG. 8 is a graph showing the relationship between the addition amount of an additive (a mixture of phosphorous acid ester and alkenyl succinic acid anhydride) and the maximum values of the bearing resistance.

In each case of the wear inhibitor (phosphorous acid ester) the oiliness agent (alkenyl succinic acid anhydride), and the combination of the wear inhibitor and the oiliness agent (the mixture of 1:1 of phosphorous acid ester: alkenyl succinic acid anhydride), explanation will be made, referring to FIGS. 6 to 8, to that the greases of changing the addition amounts of the components were used (others were similar to Example 1) for measuring the resistance values. The resistance values of FIGS. 6 to 8 are those after rotation for 200 hours or 600 hours. The resistance after 200 hours is shown with a diamond mark (♦) and the resistance after 600 hours is shown with a square mark (■).

As is seen from the graph of FIG. 6, when the wear inhibitor (phosphorous acid ester) is used in an amount of 0.1 wt % or higher based on the total weight of the grease, it is effective in controlling the resistance values after 200 and 600 hours, and the resistance value is enough suppressed from heightening with the addition of 0.5 wt % or higher based on the total weight of the grease. By the way, an upper limit of phosphorous acid compound is desirably 10 wt % or lower based on the total weight of the grease for a problem of corrosion (being acidic phosphorous acid compound is corrosive to metals).

A case of the oiliness agent (alkenyl succinic acid anhydride) will be contemplated. As will be seen from the graph of FIG. 7, when the alkenyl succinic acid anhydride is used in an amount of 0.1 wt % or higher based on the total weight of the grease, it is effective in controlling the resistance values after both 200 and 600 hours, and the resistance value is enough suppressed from heightening with the addition of 0.5 wt % or higher based on the total weight of the grease. In particular, as to values after 600 hours, it has a more superior effect than the phosphorous acid ester.

A case will be contemplated of the combination of the wear inhibitor and the oiliness agent (the mixture of 1:1 of phosphorous acid ester: alkenyl succinic acid anhydride) As seen from the graph of FIG. 8, owing to mutual action of the two kinds of additives, this case is more effective to check increasing of the resistance value than a single additive. It is seen that contribution of the alkenyl succinic acid anhydride is large.

Next explanation will be made, referring to FIGS. 9 and 10, to results of using the same greases as in Example 1 except for changing the addition amounts and average diameters of fine particles of inorganic compound and of measuring resistance values (maximum values).

Figure 9:
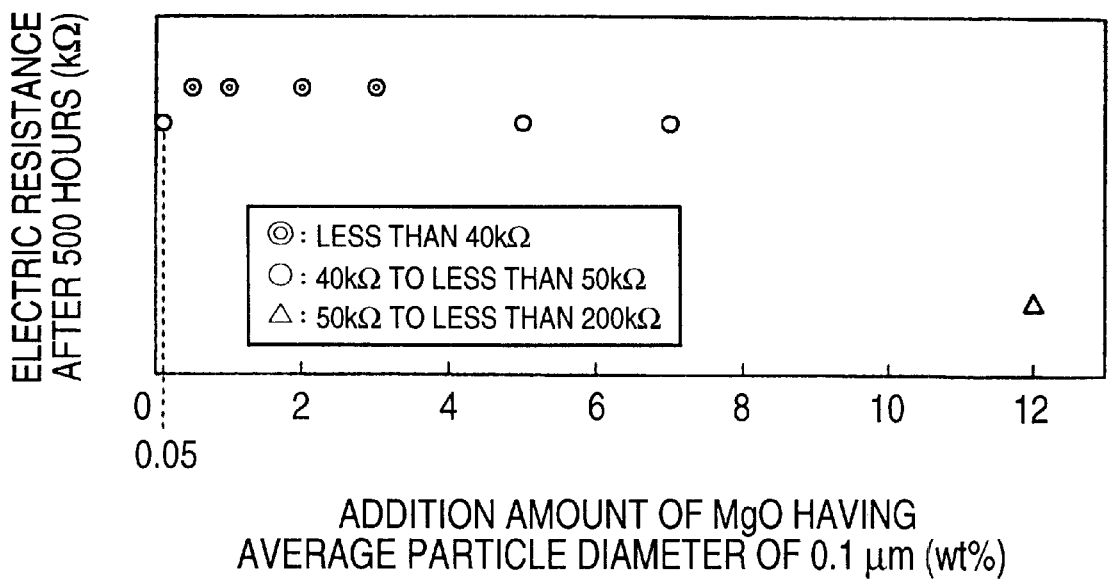
FIG. 9 is a graph showing the relationship between the addition amount of fine particle of inorganic compound and electric resistance after rotation for 500 hours, said fine particle of inorganic compound being magnesium oxide (MgO) having average diameter of 0.1 µm.

FIG. 9 is a graph showing the correlative relationship between the addition amount of fine particles of inorganic compound and the electric resistance values after rotation for 500 hours, using magnesium oxide (MgO) having an average diameter of 0.1 µm as fine particles of inorganic compound. In the same, a vertical axis does not show the values of measuring the electric resistance values, but judges performance and plots the better judgements at the upper parts. ⊚ corresponds to the maximum resistance value being less than 40 kΩ, ○ corresponds to 40 kΩ to less than 50 kΩ, and Δ corresponds to the resistance value of 50 kΩ to less than 200 kΩ.

In FIG. 9, if the addition amount of fine particles of inorganic compound is 0.05 to 7 wt % based on the total weight of the grease, it is possible to check the electric resistance value from increasing together with rotation of the bearing as the time passes. In addition, if it is 0.5 to 3 wt % based on the total weight of the grease, the electric resistance value is less than 40 kΩ, it is possible to control the electric resistance value to be smaller which increases together with rotation of the bearing as the time passes.

Figure 10:
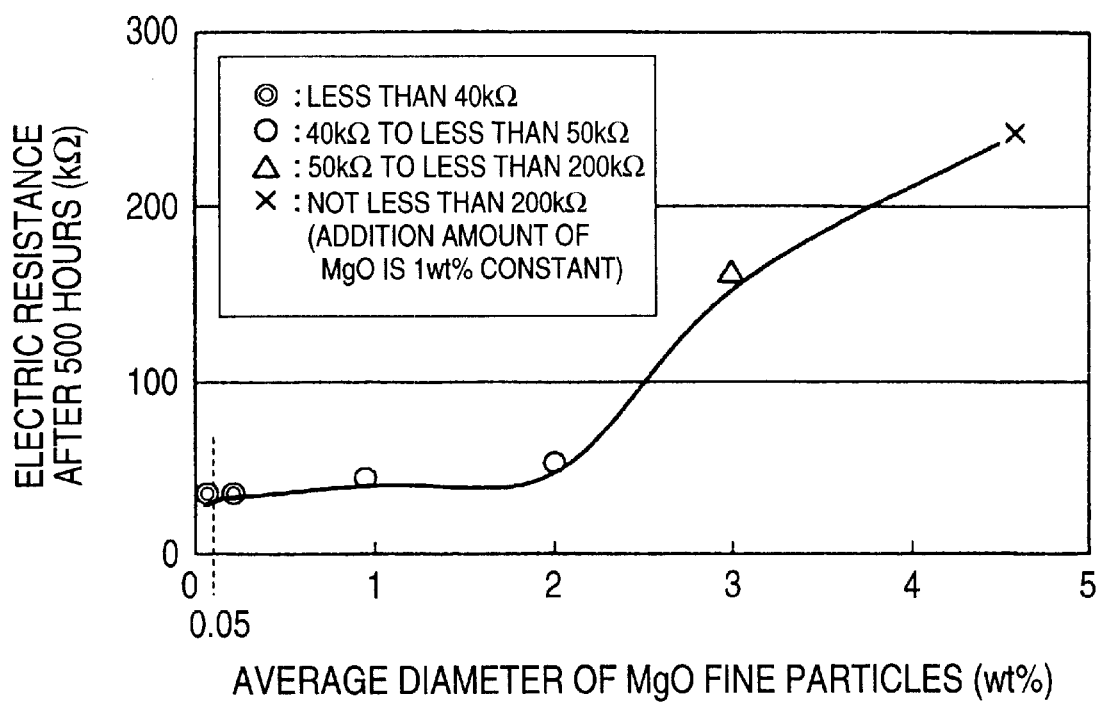
FIG. 10 is a graph showing the relationship between the average diameter of fine particle of inorganic compound and electric resistance after rotation for 500 hours, said average diameter of fine particle of inorganic compound being variously changed (the addition amount: 1 wt % based on the total weight of the grease, constant)

FIG. 10 is a graph, where grease containing fine particles of inorganic compound variously changing average diameters (the addition amount: 1 wt % based on the total weight of the grease, constant) were prepared, showing the correlative relationship between the average diameters of fine particles of inorganic compound and the electric resistance values of rotation after 500 hours. In the same, the compound of small average diameter is magnesium oxide (MgO), the compound of large average diameter is aluminum oxide ($Al_2O_3$), and the middle is a mixture of magnesium oxide and aluminum oxide. The vertical axis of the graph shows the values of measuring the electric resistance, and ⊚ corresponds to the resistance value of less than 40 kΩ, ○ corresponds to the resistance value of 40 kΩ to less than 50 kΩ, Δ corresponds to the resistance value of 50 kΩ to less than 200 kΩ and × corresponds to the resistance value of not less than 200 kΩ.

In FIG. 10, if the average diameter of fine particles of inorganic compound is 0.05 to 2 µm, it is possible to check the electric resistance value from increasing together with rotation of the bearing as the time passes.

Figure 11:
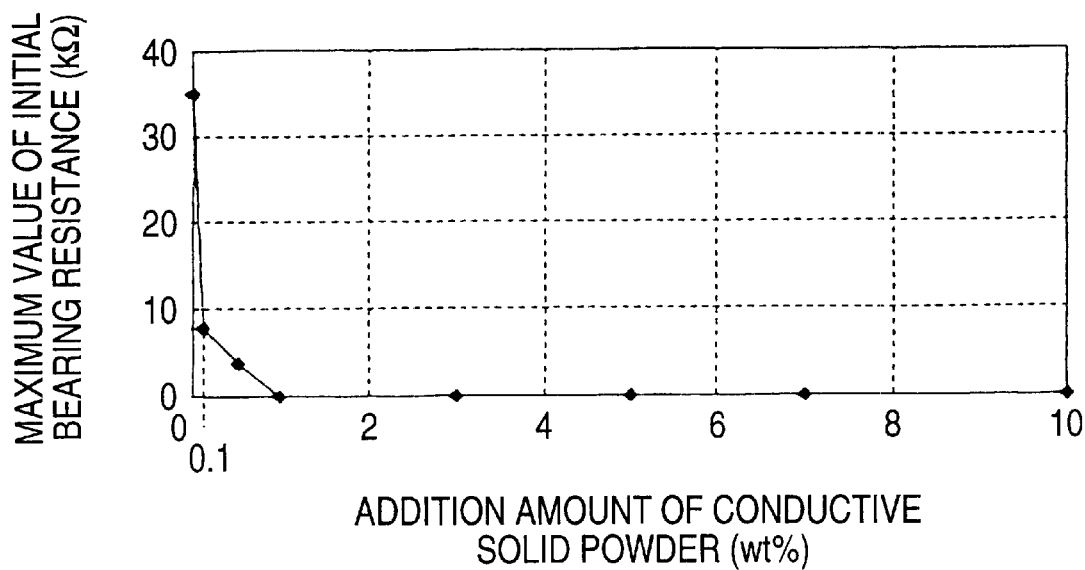
FIG. 11 is a graph showing the relationship between the addition amount of conductive solid powder and the maximum values of the bearing resistance.

In the bearings in the Example 1, explanation will be made, referring to FIG. 11, to that the greases of changing the addition amounts of the carbon black were used for measuring the resistance values. The resistance values of FIG. 11 are values at the initial period.

Since the carbon black is effective for giving the conductivity even if being a minute amount as 0.1 wt % based on the total weight of the grease, it is possible to keep the dispersion state of carbon black favorable as the time passes by restraining the addition amount of the carbon black and adding the thickener as much thereof. It is seen that the resistance value may be sufficiently reduced with the amount of 1 wt % or higher based on the total weight of the grease.

But, if the carbon black is added too much, a network structure of the carbon black to be an origin of the conductivity will be broken, and the conductive performance is easy to early change. The break of the network structure brings about a problem ready for inviting grease leakage or oil separation. For providing an appropriate worked penetration, the addition amount is desirably 10 wt % or lower based on the total weight of the grease.

That is, if the addition amount of the carbon black is much, the worked penetration is small to harden the grease. The worked penetration of the grease in Table 1 is around 250, and if adding 15 wt %, based on the total weight of the grease, of the carbon black, the worked penetration is 200 or lower, and therefore, taking a margin into consideration, it is preferable that the amount of the carbon black is 10 wt % or lower based on the total weight of the grease.

In the bearings in the Example 1, explanation will be made, referring to FIG. 12, to that the greases of changing the viscosity of the base oil were used for measuring the resistance values. The resistance values of FIG. 12 are values after rotation for 200 hours.

Figure 12:
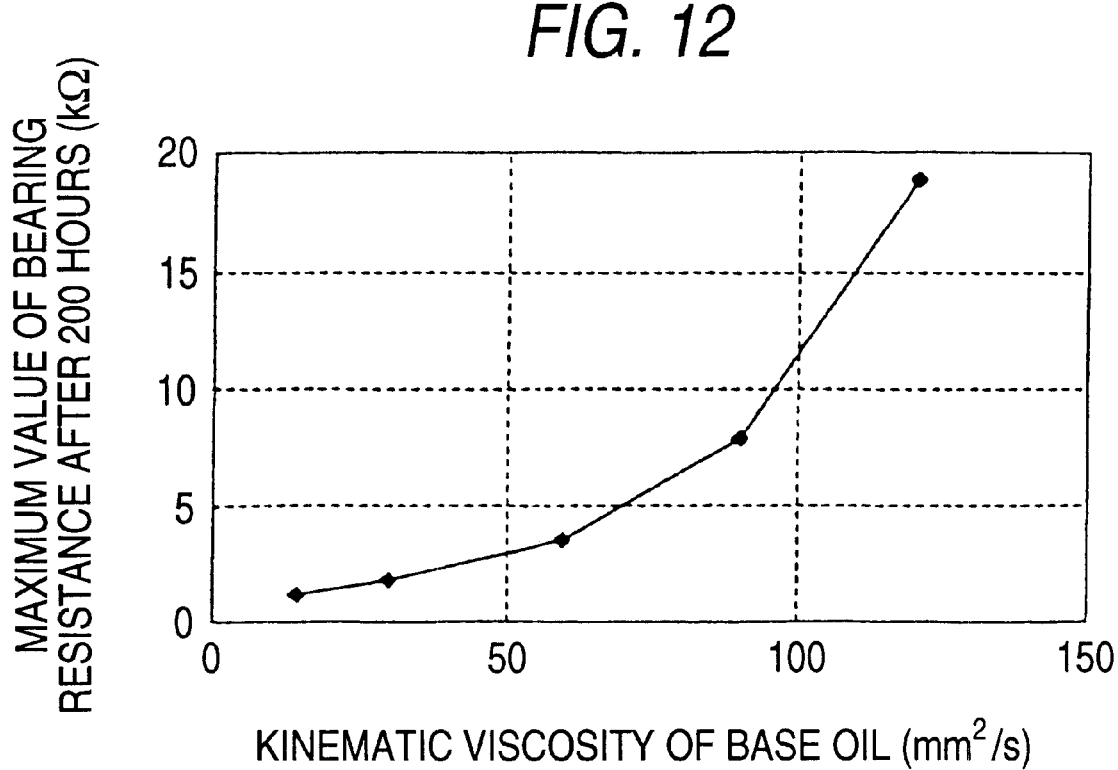
FIG. 12 is a graph showing the relationship between the kinematic viscosity of the base oil and the maximum values of the bearing resistance.
Figure 13:
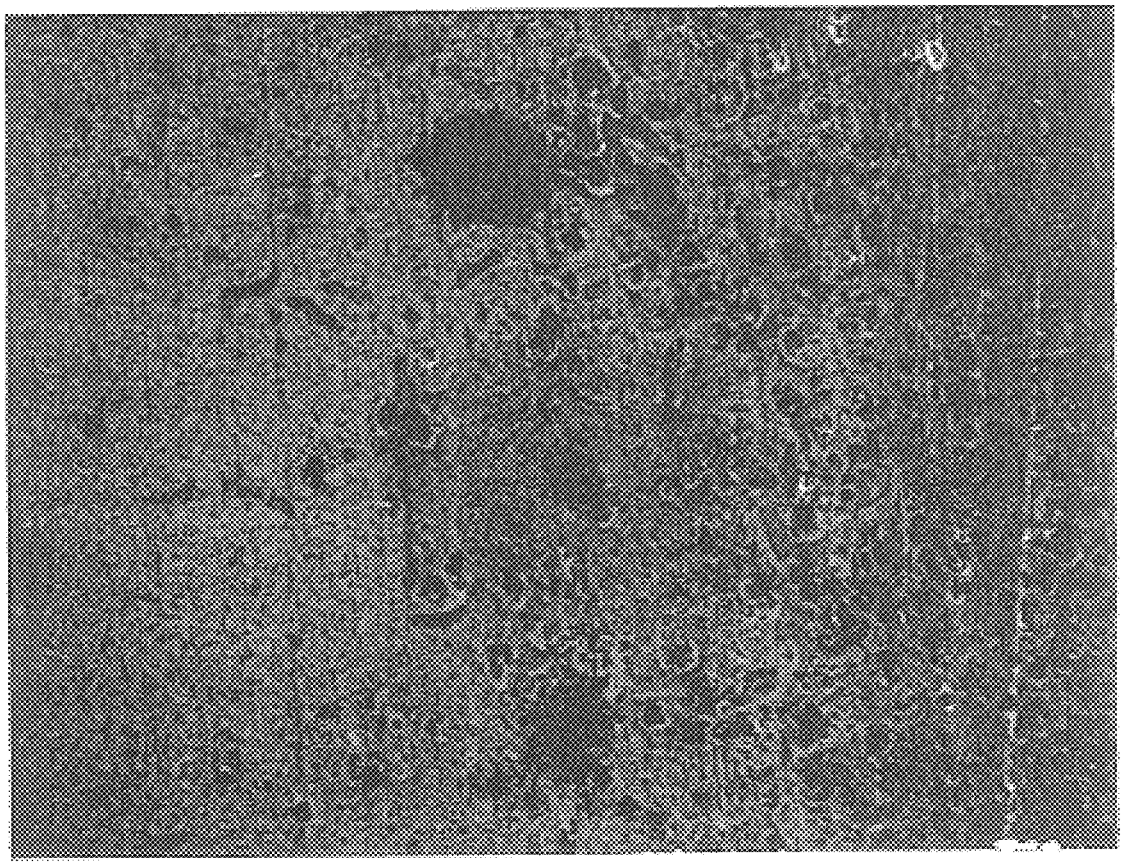
FIG. 13 is an SEM image of an inner raceway surface after the 500 hours rotation test of the rolling bearing applied with the conventional conductive grease.
Figure 14:
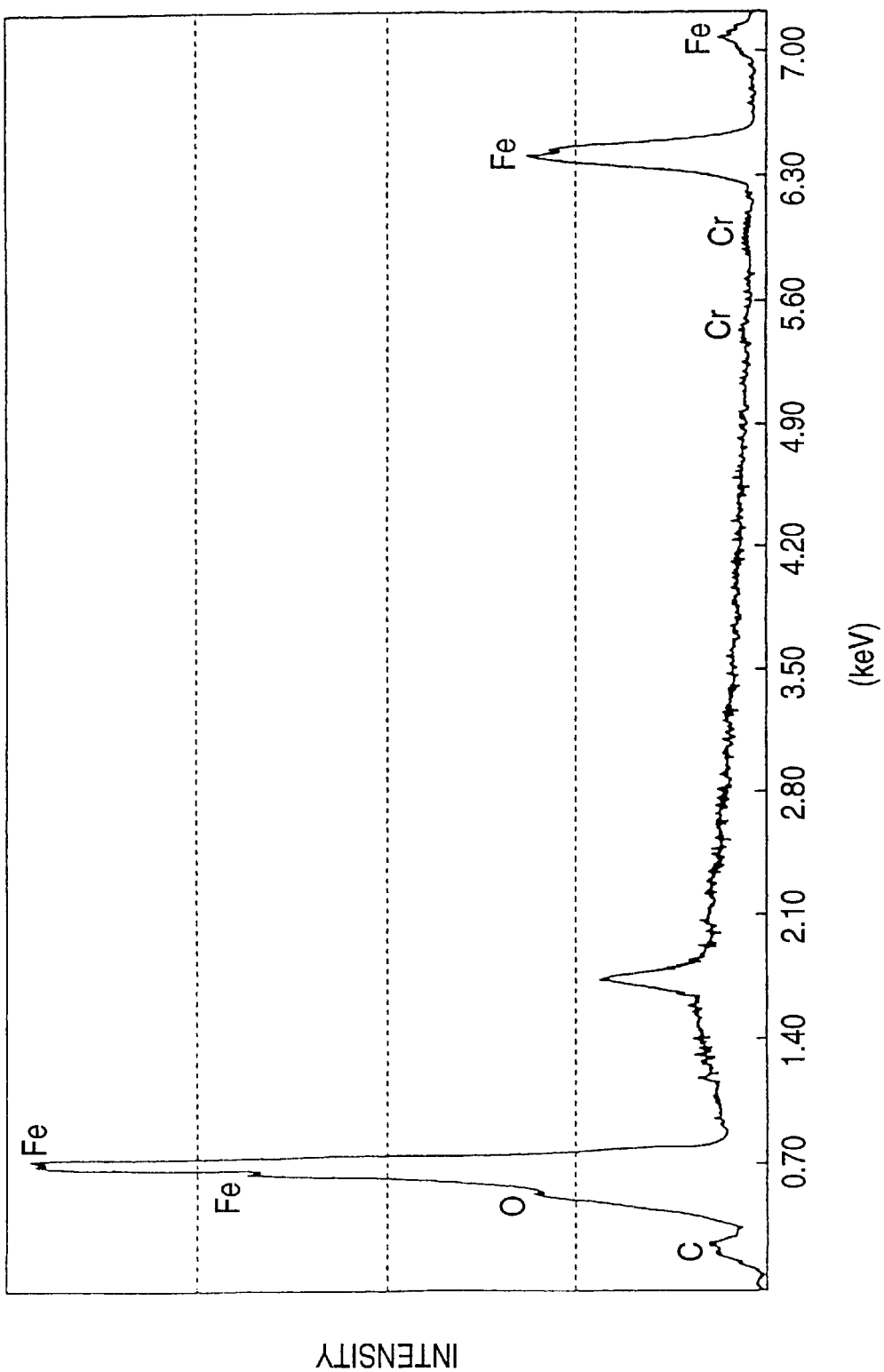
FIG. 14 is an EDS measuring chart of an inner raceway surface after the 500 hours rotation test of the rolling bearing applied with the conventional conductive grease.

As seen from FIG. 12, the higher is the kinematic viscosity at 40° C. of the base oil, the larger is the resistance value. As mentioned above, if the kinematic viscosity of the base oil is too high, an oil film becomes thick to heighten the resistance value, and preferably the kinematic viscosity is 120 $mm^2$/sec or lower, more preferably 60 $mm^2$/sec or lower since the resistance value becomes very small.

For forming a lubricant film to prevent the metal contact between the raceway surfaces and the rolling elements during rotation of the bearing, the kinematic viscosity of the base oil should be high to a certain degree, and 5 $mm^2$/sec or high is preferable, more preferably 15 $mm^2$/sec or higher. In other words, it is more preferable that the kinematic viscosity at 40° C. of the base oil is 15 to 60 $mm^2$/sec.

TABLE 2

|  |  | Ex. 2 | Ref. 1 | Com. 4 | Com. 5 |
| --- | --- | --- | --- | --- | --- |
| Thickener |  | Lithium soap | Lithium soap | Lithium soap | Lithium soap |
| Base oil | Kind | Ester oil | Ester oil | Ester oil | Ester oil |
|  | Viscosity[1] | 26 | 26 | 26 | 26 |
| Conductive additive | Kind | Carbon nanotube | Carbon nanotube | None | Carbon black |
|  | Amount | 5.0 wt % | 5.0 wt % | 0 wt % | 5.0 wt % |
| Additive | Kind | Succinic acid anhydride | None | None | None |
|  | Amount | 2.5 wt % | 0 wt % | 0 wt % | 0 wt % |
| Worked penetration |  | 249 | 245 | 245 | 245 |

Ex.: Example
Ref.: Reference Example
Com.: Comparative Example
[1]Kinematic viscosity of the base oil at 40° C., the unit is $mm^2$/sec The measuring conditions of the Example 2, Reference example 1 and the Comparative examples 4 and 5 are as follows. Rotational speed: 1000 rpm ($min^{-1}$) (when measuring the time-passing changes of the conductivity)
Axial load (Fa) given to the bearing 1: 29.4N
Applied voltage: 6.2V
Maximum current: 100 µA
Series resistance: 62 kΩ
Atmospheric temperature: 25° C.
Atmospheric humidity: 50% RH
Sampling period: 50 kHz, 0.328 seconds.

Next, evaluated results are shown in a graph for studying the contents thereof.

Figure 16:
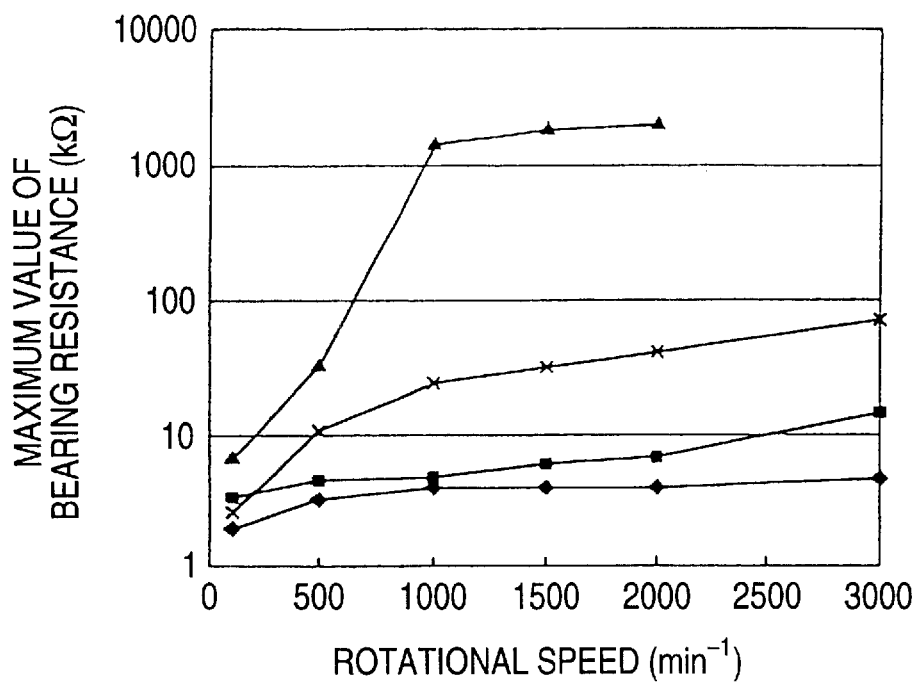
FIG. 16 is a graph showing the relationship between the rotational speeds of the ball bearing and the maximum values of the bearing resistance.

Results of evaluating the relationship between the rotational speed and the conductivity will be explained, referring to the graph of FIG. 16. In the same, the results of the Example 2 are shown with diamond marks (♦), those of Reference example 1 are shown with square marks (■), those of the Comparative example 4 are shown with triangle marks (▲), and those of Comparative example 5 are shown with cross marks (×).

As seen from the graph, in the Example 2 and the Reference example 1 packing the grease containing the carbon nano-tube, the maximum value of the bearing resistance is restrained from increasing, even if the rotational speed is large. However, in the bearings of the Comparative examples 4 and 5, the maximum value of the bearing resistance increases as the rotational speed becomes large by a cause that the oil film is formed or the carbon black component in the grease is expelled from the contacting surfaces.

Figure 17:
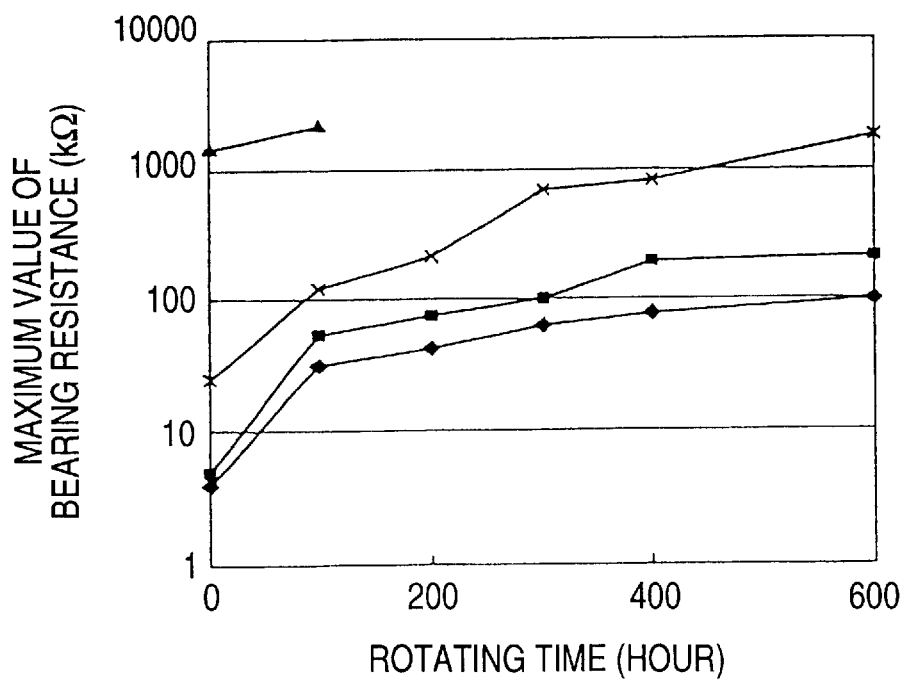
FIG. 17 is a graph showing the relationship between the rotating times of the ball bearing and the maximum values of the bearing resistance.

Next, explanation will be made to results of evaluating degrees of the time-passing changes in the conductivity, referring to the graph of FIG. 17. Also in the same, the results of the Example 2 are shown with diamond marks (♦), those of Reference example 1 are shown with square marks (■), those of the Comparative example 4 are shown with triangle marks (▲), and those of Comparative example 5 are shown with cross marks (×).

In the Example 2 and the Reference example 1 packing the grease containing the carbon nano-tube, the resistance value is restrained from increasing as the time passes. On the other hand, in the bearings of the Comparative example 5 packing the carbon black, the maximum value of the bearing resistance increases as the time passes.

The bearing of the Comparative example 4 using the grease without containing the conductive additive is very large in the maximum value of the bearing resistance since the initial period. Such bearings induce radiation noises, and in case of being applied to copiers or printers, they have probability of affecting bad influences such as strains to copied or printed images.

Figure 18:
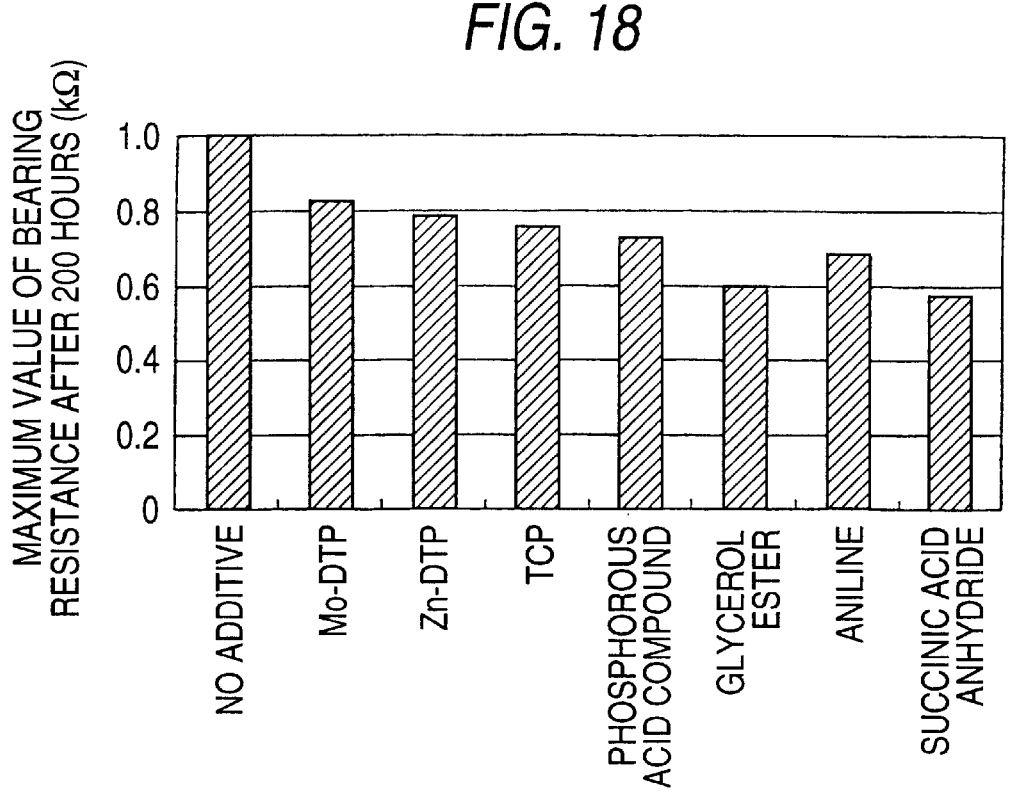
FIG. 18 is a graph showing the maximum values of the bearing resistance depending on kinds of additives in the grease.

FIG. 18 shows the results that succinic acid anhydride added to the grease was changed to other kinds of additives (the wear inhibitor, the extreme pressure agent, the oiliness agent) in the bearings of the Example 2, and the resistance values (the maximum value of the bearing resistance after rotation for 200 hours) were measured. Each numerical value is a relative value when no additive is 1. The addition amount of each of additives is 2.5 wt % based on the total weight of the grease.

As seen from FIG. 18, in each of the additives, the maximum value of the bearing resistance is small in comparison with cases of no additives, and the effect of each additive is found.

Figure 19:
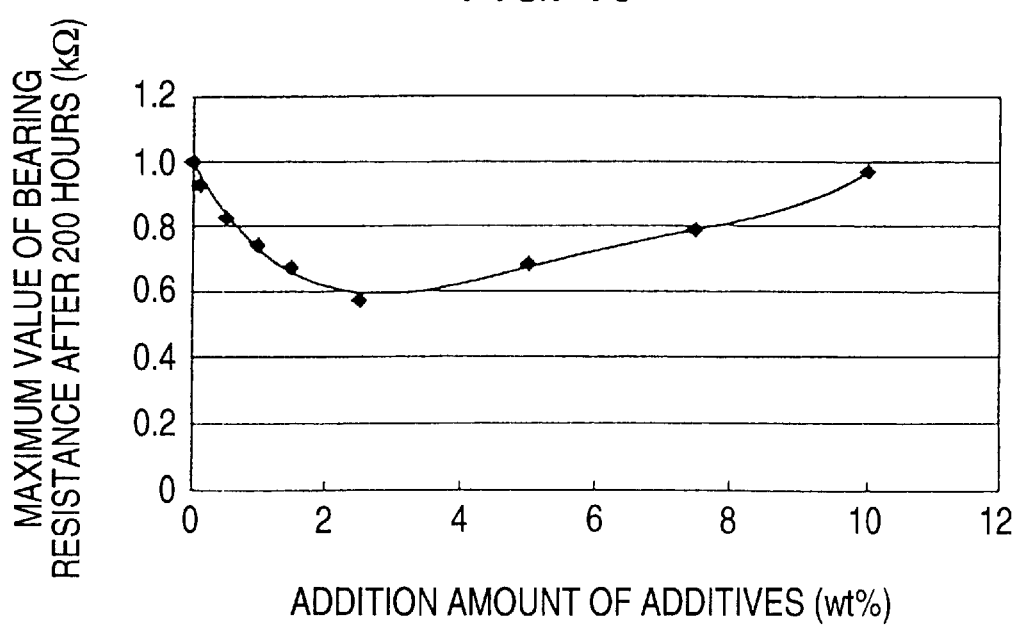
FIG. 19 is a graph showing the relationship between the amounts of the additives and the maximum values of the bearing resistance.

FIG. 19 shows the results that the amount of succinic acid anhydride added to the grease was changed in the bearings of the Example 2, and the resistance values (the maximum value of the bearing resistance after rotation for 200 hours) were measured. Each numerical value is a relative value where the value is 1 when the amount of succinic acid anhydride is 0 wt %.

From the viewpoint of the conductivity, it is seen from FIG. 19 that the addition amount of 10 wt % or lower based on the total weight of the grease is appropriate. Also for a problem of corrosion in metal parts of the raceway surface or the like, 10 wt % or lower based on the total weight of the grease is appropriate.

Figure 20:
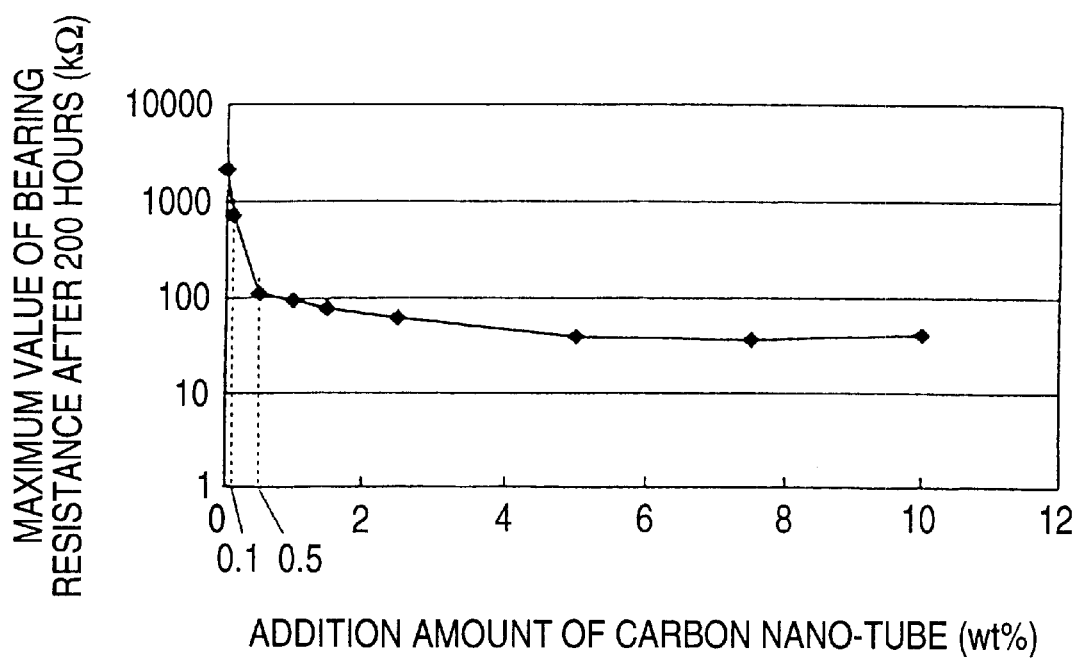
FIG. 20 is a graph showing the relationship between the amounts of carbon nano-tube added and the maximum values of the bearing resistance.

FIG. 20 shows the results of measuring the resistance values (the maximum value of the bearing resistance after rotation for 200 hours) by changing the addition amount of the carbon nano-tube to the grease.

Since the carbon nano-tube is effective for giving the conductivity even if being a minute amount as 0.1 wt % based on the total weight of the grease, it is possible to keep the dispersing state of carbon nano-tube favorable as the time-passes by restraining the addition amount of the carbon nano-tube and adding the thickener as much thereof. It is seen that the resistance value may be sufficiently reduced with the amount of 0.5 wt % or higher based on the total weight of the grease.

But, if the carbon nano-tube is added too much, the network structure of the carbon nano-tube to be an origin of the conductivity will be broken, and the conductive performance is easy to early change. The break of the network structure brings about a problem ready for inviting grease leakage or oil separation.

If the carbon nano-tube is added much, the worked penetration is small to harden the grease, and when packed into the bearing, the bearing torque is large.

From the above mentioned, the addition amount of the carbon nano-tube is preferably 10 wt % or lower based on the total weight of the grease.

Figure 21:
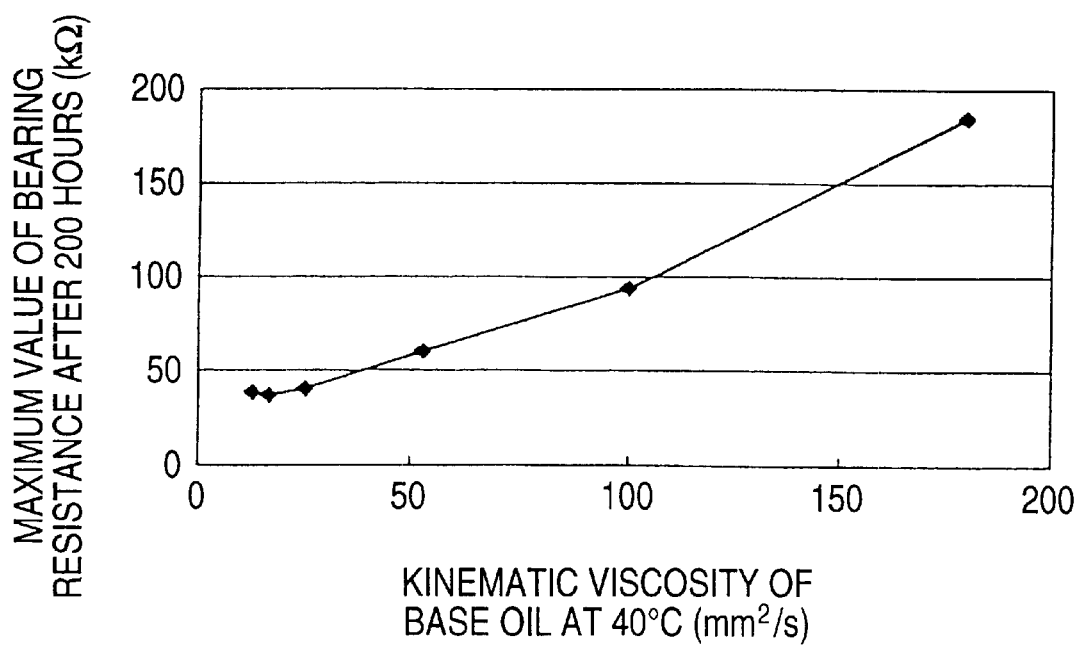
FIG. 21 is a graph showing the relationship between kinematic viscosity of the base oil and the maximum values of the bearing resistance.

In the bearings in the Example 2, FIG. 21 shows the results that the viscosity of the base oil in the greases was changed for measuring the resistance values (the maximum value of the bearing resistance after rotation for 200 hours).

As seen from FIG. 21, the higher is the kinematic viscosity at 40° C. of the base oil, the larger is the resistance value. As mentioned above, if the kinematic viscosity of the base oil is too high, an oil film becomes thick to heighten the resistance value, and preferably the kinematic viscosity is 100 m²/sec or lower.

For forming a lubricant film to prevent the metal contact between the raceway surfaces and the rolling elements during rotation of the bearing, the kinematic viscosity of the base oil should be high to a certain degree, and 5 mm²/sec or high is preferable.

Figure 22:
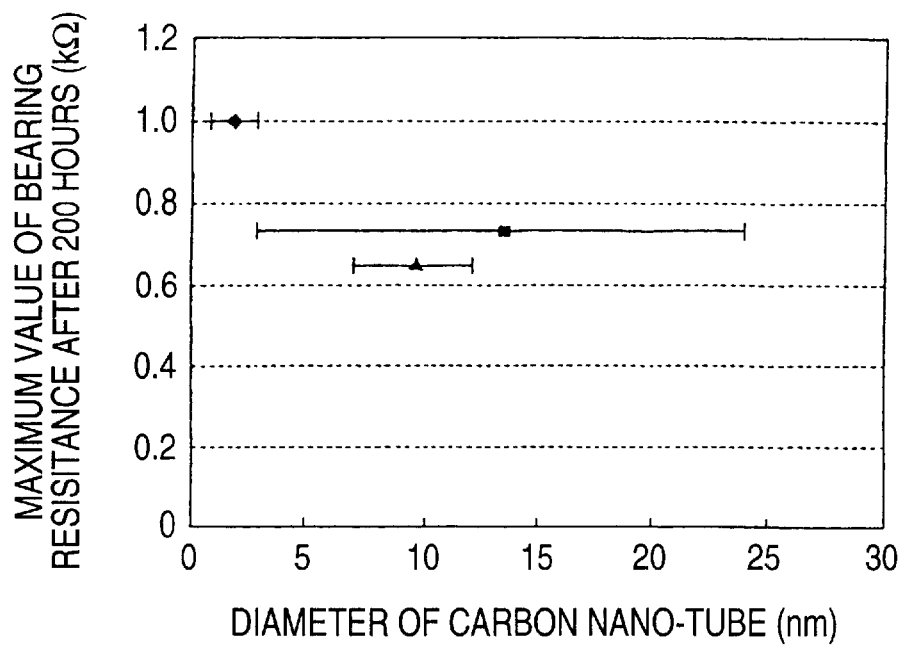
FIG. 22 is a graph showing the relationship between diameters of the carbon nano-tube and the maximum values of the bearing resistance.
Figure 23:
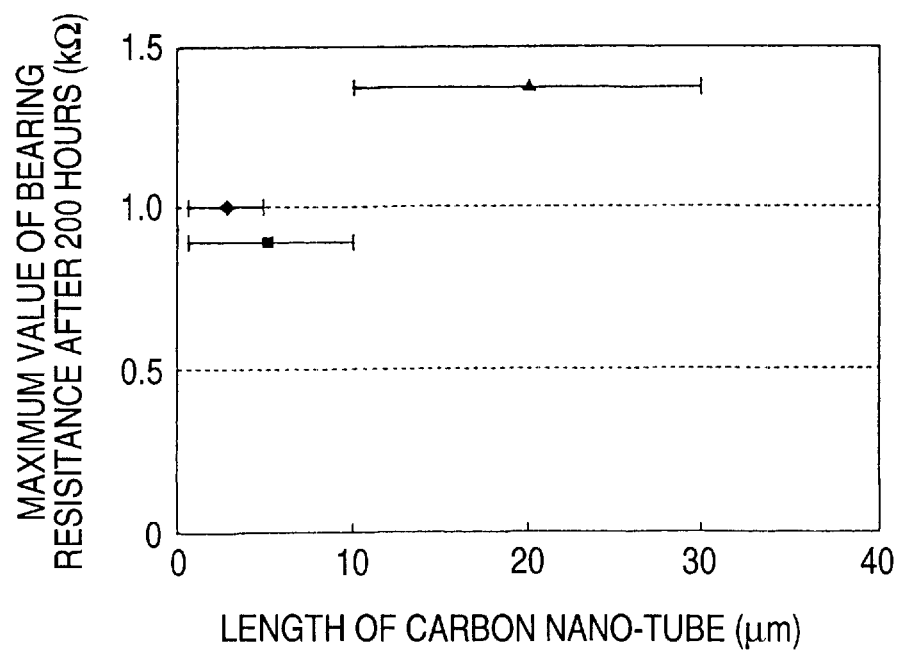
FIG. 23 is a graph showing the relationship between length of the carbon nano-tube and the maximum values of the bearing resistance.
Figure 24:
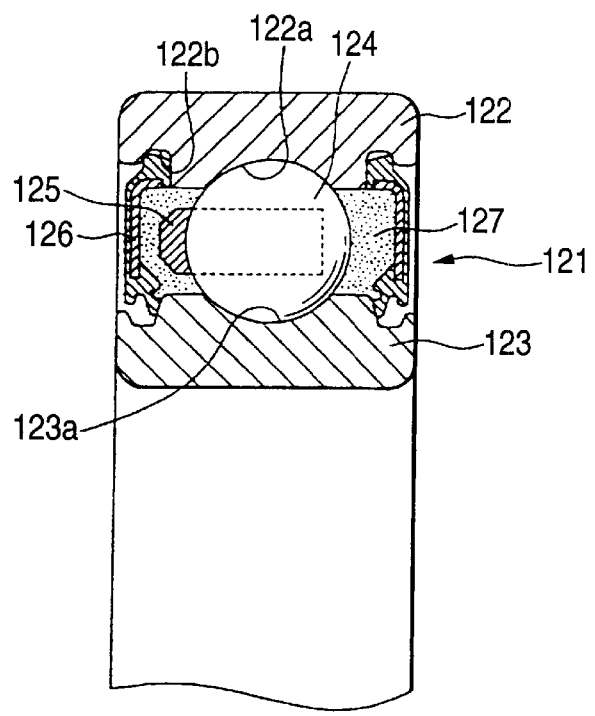
FIG. 24 is a cross sectional view showing a structure of a ball bearing applied with a conventional conductive grease.

FIGS. 22 and 23 show the results that the kinds of the carbon nano-tube were variously changed in the bearings of the Example 2, and the resistance values (the maximum value of the bearing resistance after rotation for 200 hours) were measured. Each of the resistance values shown in the graph is a relative value when the value of the Example 2 is 1.

Explanation will be made to cases of changing the diameters of the carbon nano-tube, referring to FIG. 22. In the graph of FIG. 22, the results of the carbon nano-tube having diameters of 1 to 3 nm (the Example 2) are shown with the diamond mark (♦), those of 3 to 24 nm are shown with the square mark (■), and those of 7 to 12 nm are shown with the triangle mark (▲). Each of the carbon nano-tubes is 0.5 to 5 μm in length.

As is seen from FIG. 22, the excellent conductivity is shown, irrespective of diameters of carbon nano-tubes.

Explanation will be made to cases of changing the length of the carbon nano-tube, referring to FIG. 23. In the graph of FIG. 23, the results of the carbon nano-tube having length of 0.5 to 5 μm (the Example 2) are shown with the diamond mark (♦), those of 0.5 to 10 μm are shown with the square mark (■), and those of 10 to 30 μm are shown with the triangle mark (▲). Each of the carbon nano-tubes is 1 to 3 nm in diameter.

As seen from the graph of FIG. 23, the excellent conductivity is shown, irrespective of length of carbon nano-tubes. When the length of the carbon nano-tubes are 10 to 30 μm, the resistance value is slightly large, but such degrees are enough practically applicable.

With respect to several kinds of rolling bearings similar to the rolling bearing 11 shown in FIG. 25, explanation will be made to results of measuring resistance values of the inner and outer races during rotation and evaluating degrees of the time-passing changes of the conductivity in the conductive greases.

Figure 3:
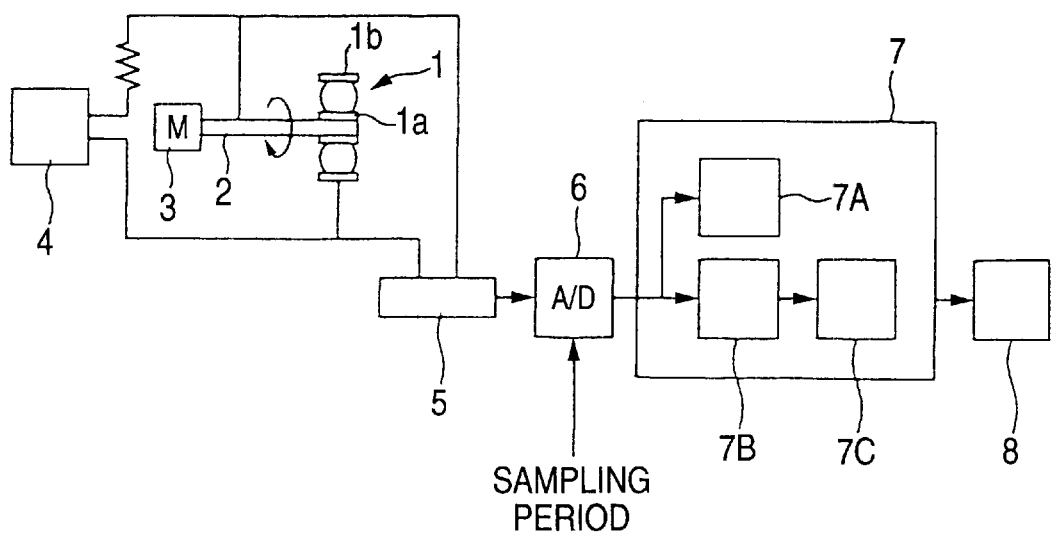
FIG. 3 is a schematic view of an apparatus measuring resistance values of the conductive grease.

An apparatus of measuring the resistance value is the same as that of FIG. 3. The same as described above is also a method of measuring and evaluating the resistance values between the inner and outer races of the rolling bearing 1 by use of the apparatus of the above-mentioned structure.

The oil separation degree of the conductive grease packed within the bearing was changed per each of bearings so as to measure the resistance value (the maximum value) during rotation between the inner race 12 and the outer race 13 of each bearing by using the apparatus as shown in FIG. 3. The bearing is the ball bearing having the 8 mm inner diameter, the 22 mm outer diameter and the 7 mm width. The components of the grease are as shown in Table 3, the packing amounts being 155 to 165 mg.

TABLE 3

| Grease | Reference Example 2 |
|---|---|
| Thickener | Lithium soap |
| Base oil    Kind | PAO |
| Viscosity[1] | 30.0 |
| Conductive powder wt % | Carbon black |
|  | 5.0 |
| Worked penetration | 245 |

[1]Kinematic viscosity of base oil at 40° C., the unit is mm$^2$/s

The measuring conditions at this time are as follows.
Rotational speed of the shaft member 2: 150 rpm (min$^{-1}$)
Radial load (Fr) given to the bearing 1: 19.6N
Applied voltage: 6.2V
Maximum current: 100 μA
Atmospheric temperature: 25° C.
Atmospheric humidity: 50% RH.

Figure 26:
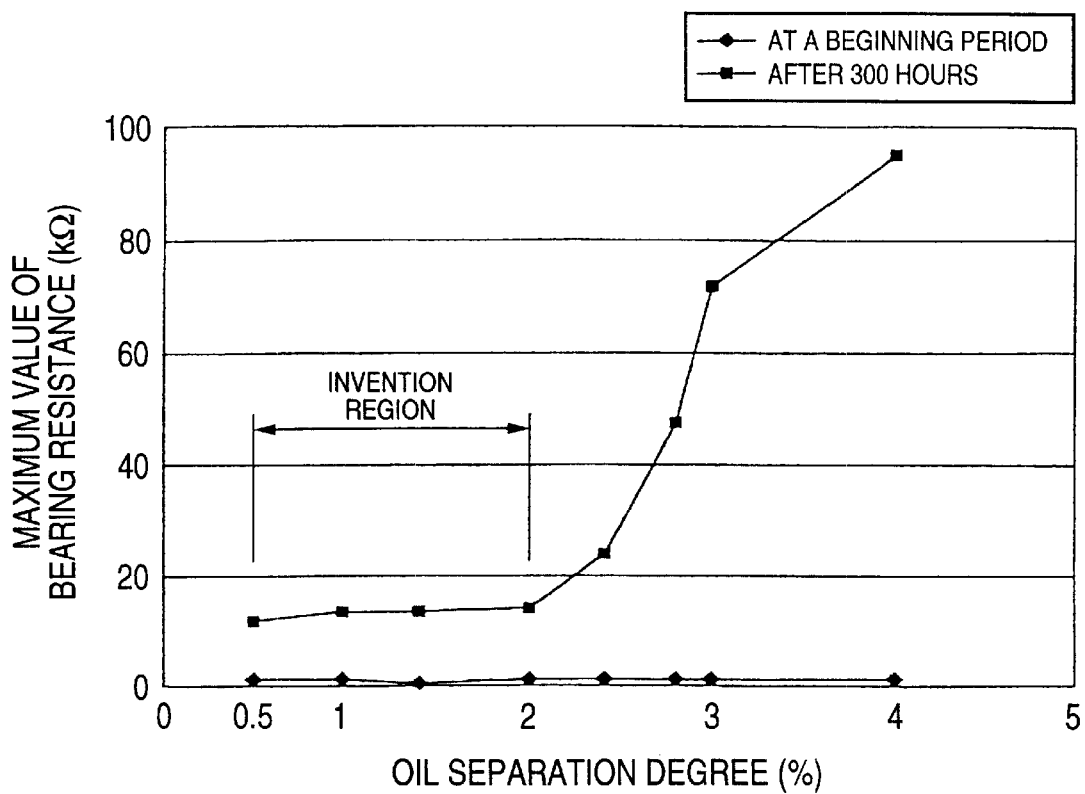
FIG. 26 is a diagram showing results of measuring the resistance values between the inner and outer races of the rolling bearing by the apparatus shown in FIG. 3.

The above measured results are shown in FIG. 26 where the lateral axis shows the oil separation degree (%) of the conductive grease at 100° C. after 24 hours, while the vertical axis shows the electric resistance value (kΩ) between the inner race and the outer race. The resistance value at a beginning period is shown by the diamond mark (♦) and the resistance value after 300 hours is shown with the square mark (■).

As shown in the same, with respect to the bearings using the conductive grease where the oil separation degree exceeds 2%, the resistance value between the inner and outer races is largely different between at a beginning period and after 300 hours, from which it is seen that when the oil separation degree of the conductive grease exceeds 2%, it goes down as the time passes. In contrast, with respect to the bearings using the conductive grease of the oil separation degree being 2% or lower, the resistance value between the inner and outer races does not go up so much even after 300 hours in comparison with that at a beginning period. From this fact, if the oil separation degree is controlled to be 2% or lower, it is possible to restrain the conductivity in the conductive grease from decreasing as the time passes.

It is seen from FIG. 26 that the carbon black is evenly dispersed within the bearing at the beginning, and as the chain structures of solid particles are not yet broken, the resistance value between the inner and outer races is not governed by the oil separation degree, but when the using time is over 300 hours, the carbon black is expelled from the contacting faces of both races to the rolling elements, otherwise the base oil of releasing the oil stays about the contacting part, so that the resistance value between both races rapidly goes up. Thus, for keeping the conductivity of the conductive grease stable for a long term, it is good to control the oil separation degree of the conductive grease to be 2% or lower, preferably to be between 2% or lower to 0.5% or higher.

The bearing after 300 hours from the use-starting was taken out from the apparatus of FIG. 3, left still for 200 hours, again attached to the apparatus of FIG. 3 for performing the test, and measured in the resistance values between both races after rotation for 300 hours. The results are shown in FIG. 27 where ♦ shows the resistance values therebetween using the conductive grease having the oil separation degree of 1%, and ■ shows the resistance values therebetween using the conductive grease having the oil separation degree of 3%.

Figure 27:
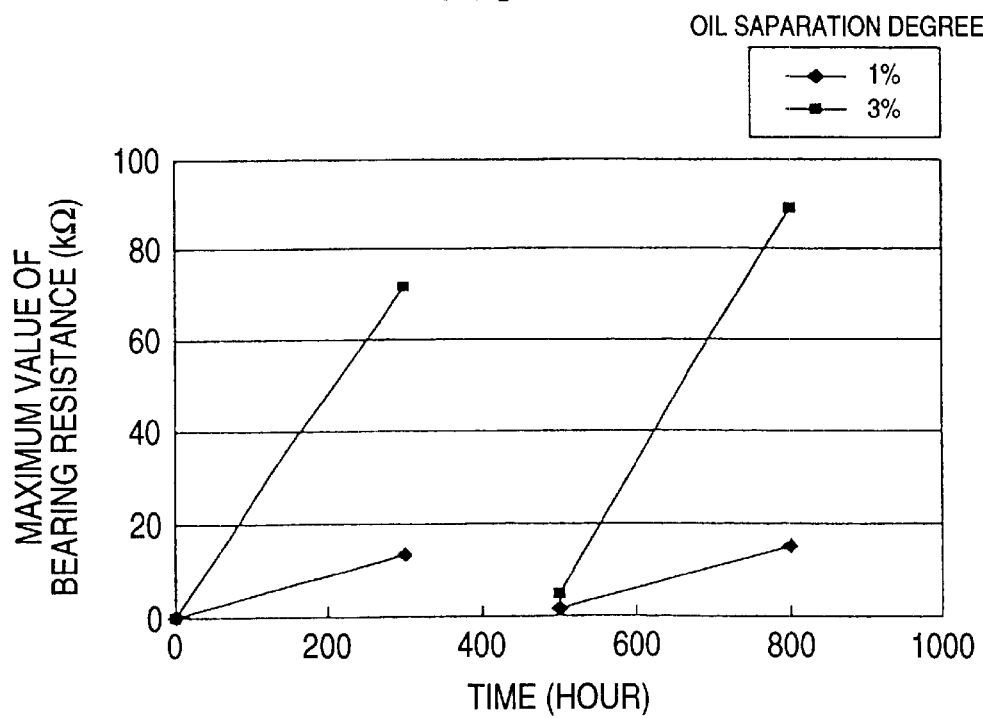
FIG. 27 is a view showing results of investigating the relationship between the oil separation degree of the conductive grease and the conductivity thereof by using the apparatus shown in FIG. 3.

As shown in FIG. 27, the resistance value of each bearing immediately after re-attaching to the test apparatus of FIG. 3 shows the low value in each of the conductive grease of the 1% oil separation degree and the conductive grease of the 3% oil separation degree. This may be assumed that the running tracks of the rolling elements are slightly different, otherwise the chain structures of the carbon black recovers while being left still. However, when the time goes for a while after re-testing, the resistance value of the bearing instantly increases, and in the bearing using the conductive grease of the 3% oil separation degree, the resistance value rapidly goes up in comparison with the bearing using the conductive grease of the 1% oil separation degree. Thus, also from this fact, if controlling the oil separation degree of the conductive grease packed in the bearing to be 2% or less, preferably to be between 2% or lower to 0.5% or higher, the conductivity of the conductive grease can be restrained from decreasing as the time passes.

Figure 28:
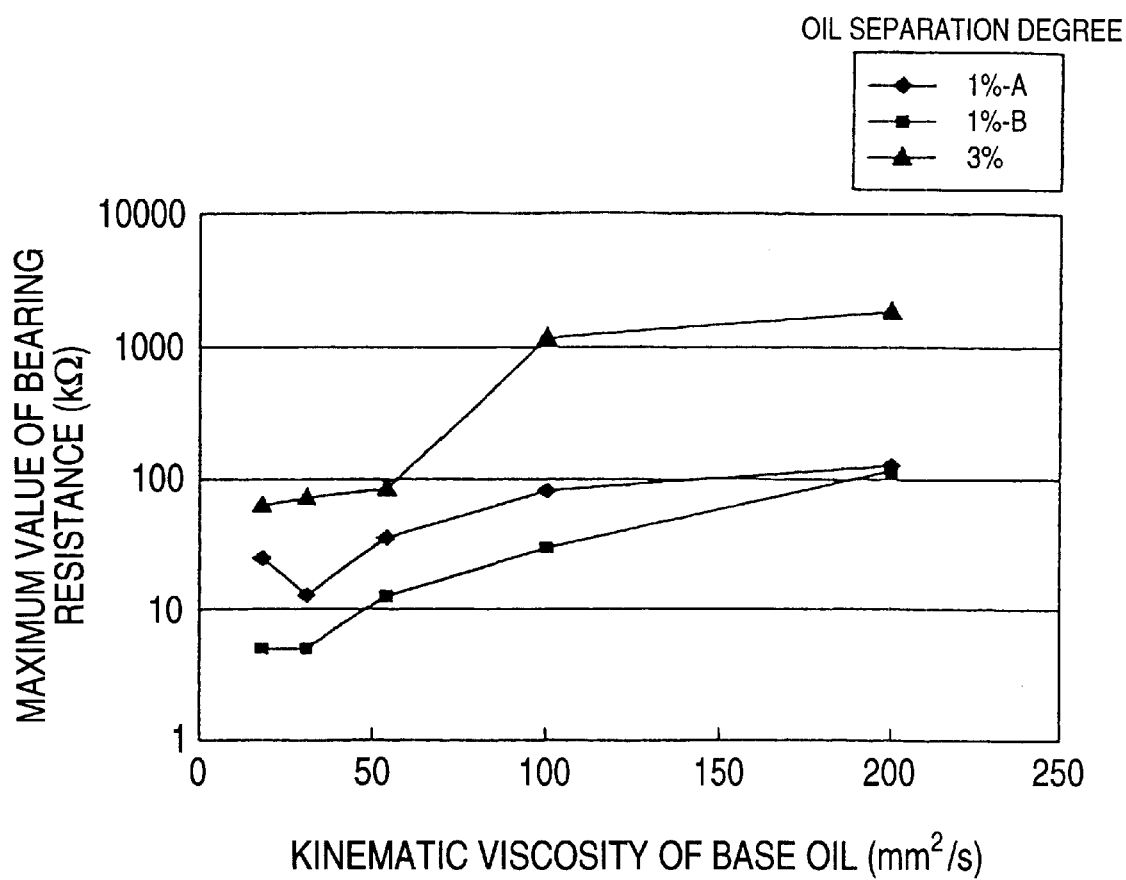
FIG. 28 is a view showing results of investigating the relationship between the viscosity of the base oil of the conductive grease and the conductivity thereof by using the apparatus shown in FIG. 3.

FIG. 28 shows the experimented results of contemplating the relation between the viscosity of the base oil at 40° C. of the conductive grease and the bearing resistance value. In the same, ♦ shows a result for the conductive grease having the oil separation degree of 1%, ■ shows a result for the conductive grease having the oil separation degree of 1% and further containing the succinic acid anhydride as the oiliness agent in an amount of 2.5 wt % based on the total weight of the grease, and ▲ shows a result for the conductive grease having the oil separation degree of 3%, respectively.

As shown in FIG. 28, if the viscosity of the base oil in the conductive grease is heightened, the bearing resistance value goes up, and if the oil separation degree is also brought up, this tendency is remarkable. This may be assumed that the carbon black in the grease gives an influence as a conductive material.

The base oil used to the grease has specific volume resistibility very often exceeding $10^{10}$ Ω·cm, and it much stays in contacting parts of the leaking base oil, thereby to rapidly increase the resistance value. It is not preferable in the lubricity to bring down the viscosity of the base oil. In a case of the metal contact of the inner and outer races and the rolling elements, the bearing resistance value is lowered, and the bearing extremely wears the surface. Being high in activity, wore fine new surfaces react with oxygen or the like in the air to form oxide films, resulting in increasing the resistance value. So, the viscosity of the base oil is preferable 5 to 200 m$^2$/s, and more preferably 15 to 100 m$^2$/s.

Figure 29:
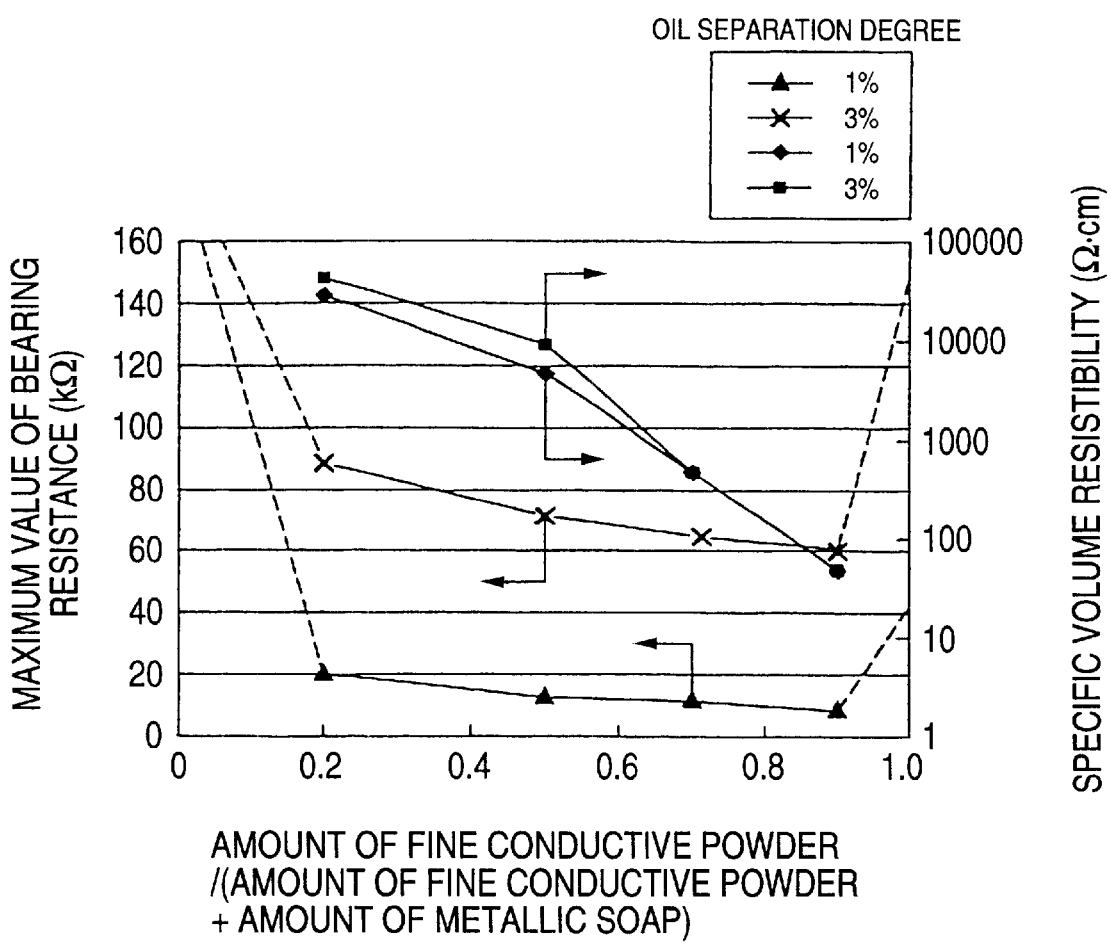
FIG. 29 is a view showing results of investigating the relationship between the amount of the fine conductive powder added to the conductive grease and the conductivity by using the apparatus shown in FIG. 3.

Further, if adding additives effective in the wear inhibitors to the conductive grease, injuries in the surfaces are prevented, and a life of the conductivity may be increased. The amount of the additives is not especially limited, but to be until 10 wt % based on the total weight of the grease is reasonable from the viewpoint of corrosion or affinity with neighboring resins. As to the grease where the amount of carbon black in the conductive grease, the amount of thickener (lithium soap) and the amount of additive (succinic acid anhydride) were adjusted, and the worked penetration was made agree with 245, FIG. 29 shows the compared results of the maximum resistance value and the specific volume resistibility after 300 hours, being based on the ratio of the carbon black amount/(the carbon black amount and the thickener amount). In the same, ▲ shows the maximum resistance value for the conductive grease having the oil separation degree of 1%, × shows the maximum resistance value for the conductive grease having the oil separation degree of 3%, ♦ shows the specific volume resistivity for the conductive grease having the oil separation degree of 1%, and ■ shows the specific volume resistivity for the conductive grease having the oil separation degree of 3%, respectively.

As shown in FIG. 29, as to the conductive greases having the low oil separation degree, though the specific volume resistibility has a certain permitted freedom, they have high ratio of contacting the contact face of the carbon black, and can maintain the low resistance value. If determining the oil separation degree of the conductive grease to be 2% or lower, the ratio of the carbon black amount/(the carbon black amount and the thickener amount) to be 0.2 to 1.0, preferably 0.2 to 0.9, it is possible to maintain the resistance value between the inner and outer races at the low values for a long term.

From the above mentioned, if determining the oil separation degree of the conductive grease packed in the bearing to be 2% or lower, the conductivity thereof can be restrained from the time-passing decline, whereby the conductivity can be kept stable for a long term, so that it is possible to exactly remove influences owing to the static electricity for a long time and heighten reliability.

In the above Reference example 2 (Table 3), such a case was exemplified that the lithium soap was added as the thickener, and in case the carbon black is used as the thickener, the same effect can be obtained if the oil separation degree is 2% or lower.

As methods of changing the oil separation degree of the conductive grease, there are various manners, for example, when the lithium soap is used as the thickener, the base oil is sufficiently agitated with lithium stearate at set temperatures (e.g., 120° C.) for about one hour, sufficiently dehydrated, and slowly heated (e.g., 1 to 3° C./min) at about 230° C. so as to dissolve the soap into the base oil, and after heightening the temperature, the base oil is cooled. At this time, the thickener is formed, and the grease is produced, and it is mixed with agents, subjected to rolling and kneading. Thus the grease is accomplished.

When making a raw grease, depending on the control of temperatures (in particular, the control of cooling rate) or the agitating conditions, if the cooling rate is slow, a soap component of the lithium soap is twisted into a long fiber, and if being rapid, it is twisted into a short fiber, and accordingly, though the thickeners are at the same addition amount, the worked penetration of the grease can be adjusted to a certain extent and the oil separation degree can be somewhat adjusted. The long fibrous grease trends to relatively large in the oil separation degree. In addition, there is an inclination that basically if the amount of the thickener is much, the amount of the base oil is relatively decreased, and the oil separation degree becomes small.

If the conductive fine particle (carbon black) is contained and the only carbon black is the thickener, it may be mixed and kneaded as it is in the base oil. For example, it is not necessary to heighten the temperature till 230° C., and while agitating at appropriate temperature (e.g., about 100° C.), the carbon black is added bit by bit to produce the raw grease. When adding both of the lithium soap and the carbon black, any of the followings may be employed;

(1) during heightening temperatures in a process of the raw grease, the carbon black is added little by little;
(2) after heightening temperature and while being hot (before cooling), the carbon black is added little by little; and
(3) after cooling, the carbon black is added together with the additives.

With respect to several kinds of ball bearings (the Reference examples 3, 4 and the Comparative examples 6 to 8) of substantially the same structure of the above-mentioned ball bearing 31, test results will be explained.

The dimensions of the test bearings have the 30 mm inner diameter, the 42 mm outer diameter and the 7 mm width, and a space defined by the outer race, the inner race, and the seals encircling is packed with the conductive grease in an amount of 28 to 41% based on the a space capacity. The conductive greases are composed of the base oils, the thickener and the carbon black (the conductive additive) shown in Table 4.

TABLE 4

|  | Ref. 3 | Ref. 4 | Com. 6 | Com. 7 | Com. 8 |
| --- | --- | --- | --- | --- | --- |
| Base oil | A | Fluoro-silicone | A | Poly α-olefin | Silicone oil |
| Thickener | PTFE[1] CB[2] | PTFE CB | PTFE | Li soap CB | CB |
| Amount of CB[3] | 5.0 | 5.0 | 0 | 5.0 | 10.0 |
| Acoustic test | ○ | ○ | ○ | x | x |

Ref.: Reference Example Com.: Comparative Example
A: Purfuloropolyether
[1]PTFE: Polytetrafluoroethylene
[2]CB: Carbon black
[3]Unit: Weight %

The bearings of the Reference examples 3 and 4 used polytetrafluoroethylene (PTFE) and carbon black (CB) as the thickener of the conductive grease. The using amount of CB is 5 wt % based on the total weight of the conductive grease. The base oil of the Reference example 3 is perfluoropolyether, and the base oil of the Reference example 4 is fluorosilicones.

The bearing of the Comparative example 6 is almost the same as that of the Reference example 3 but the grease does not contain CB and does not having the conductivity. The bearing of the Comparative example 7 does not use the silicon compound nor the fluorine compound as the thickener of the conductive grease, but employs a known thickener. The bearing of the Comparative example 8 uses only CB as the thickener of the conductive grease.

These ball bearings were rotated at the high temperature of 180° C., under Fr=19.6N, at the rotation number of 100 min$^{-1}$ for 400 hours. After finishing rotation, acoustic tests were carried out by an anderometer for checking wears in the ball bearings. Results are shown in Table 4, where good results are shown with ○, while bad results are shown with x.

The electric resistance values (the bearing resistance values) between the inner and outer races were measured while the bearings were rotating after the bearing were rotated at the above high temperature for 200 and 400 hours, and the degrees of the time-passing changes of the conductivity were evaluated.

The apparatus for measuring the bearing resistance value is the same as that shown in FIG. 3. Also the same is mentioned above as the manner of evaluating the electric resistance values of the ball bearing 1 by use of the apparatus of the above structure.

As to the five kinds of bearings (the Reference examples 3, 4 and the Comparative examples 6 to 8), the electric resistance values (the maximum values) between the inner and outer races 1a, 1b during rotation were measured using the apparatus of the above structure.

The measuring conditions are as follows.
Rotational speed of the bearing member 2: 100 rpm ($min^{-1}$)
Radial load (Fr) given to the bearing 1: 19.6N
Applied voltage: 6.2V
Maximum current: 100 $\mu A$
Series resistance: 62 k$\Omega$
Atmospheric temperature: 40° C.
Atmospheric humidity: 50%RH
Sampling period: 50 kHz, 0.328 seconds.

Figure 31:
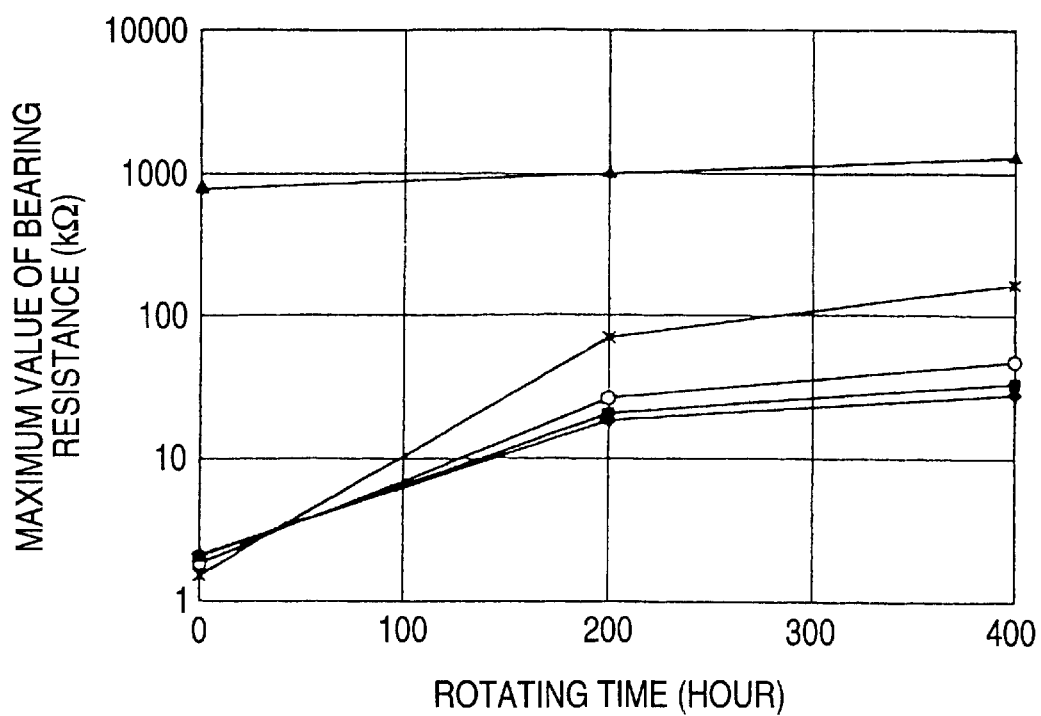
FIG. 31 is a graph showing the relationships between the rotating time of the bearing and the maximum values of the bearing resistance.

The measured results are shown in the graph of FIG. 31 where the Reference example 3 is shown with ♦, the Reference example 4 is ■, the Comparative example 6 is ▲, the Comparative example 7 is ×, and the Comparative example 8 is shown with ○.

As is seen from the graph of FIG. 31, each of bearings containing the carbon black has the small maximum value of the bearing resistance at the beginning (rotating time: 0 hour.) On the other hand, the Comparative example 6 using the grease without containing the carbon black has the large maximum value of the bearing resistance. In the bearing, the static electricity occurring together with rotation is easy to electrify, and if applying such bearings to copiers or printers, radiation noises of the static electricity probably give bad influences such as distortion to images (such as copied images of copiers).

Since the Comparative example 7 does not use the silicon compound nor the fluorine compound as the thickener, the heat resistance of the conductive grease is insufficient, when an environmental temperature goes up to 180° C., the conductive grease is remarkably deteriorated, and the resistance value increases owing to injuries in the raceway surfaces of the bearing and formation of the oxide film. Results of the acoustic tests are also bad.

Besides, when the only carbon black to be an origin of the conductivity is used as the thickener as in the Comparative example 8, though the conductivity is well conditioned, the net work structure of the carbon black is easily destroyed to bring about the grease leakage or the oil separation. Being solid, the particles of the carbon black are easy to injure the raceway surfaces of the bearing and shorten the acoustic lives.

In regard to the ball bearings using the conductive greases containing several kinds of additives, explanation will be made to results of measuring the bearing resistance values. The ball bearings were rotated at high temperature similarly to the above mentioned for 200 hours and then the maximum values of the bearing resistance was measured.

Used additives are sodium nitrite ($NaNO_2$), $MOS_2$, synthetic mica and fluorophosphazen derivative. The addition amount is 2.5 wt % based on the total weight of the conductive grease. As to the structure of the test bearings, others than addition of the additives are the same in the bearing of the Reference example 3.

Figure 32:
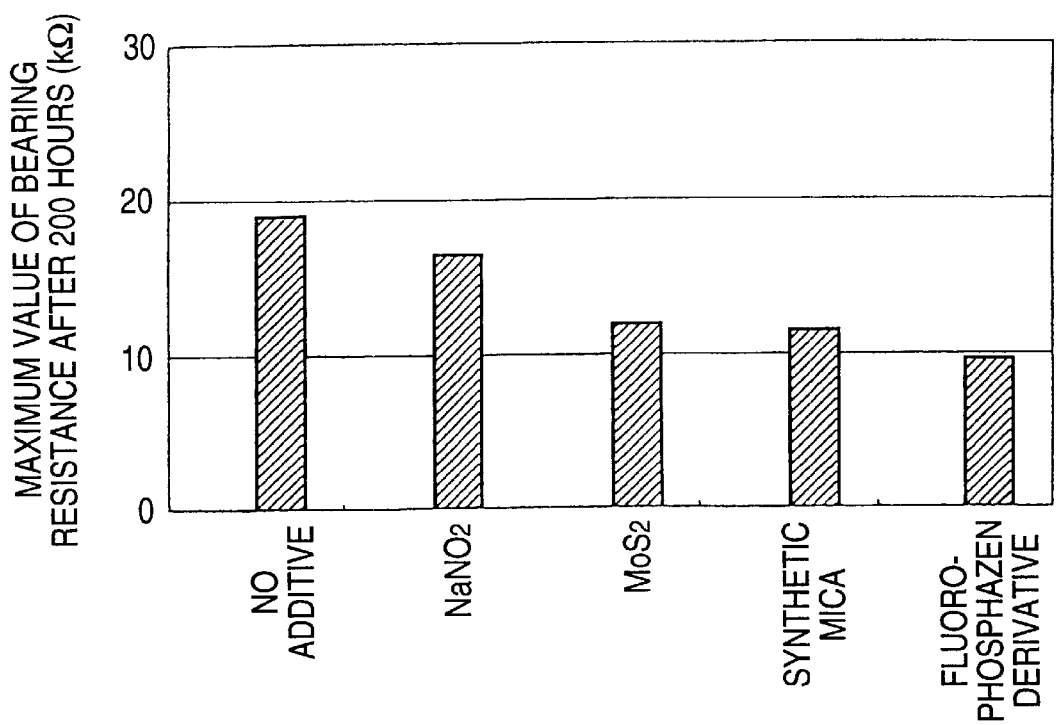
FIG. 32 is a graph showing the maximum values of the bearing resistance depending on kinds of the additives in the grease.

Results are shown in the graph of FIG. 32 from which as seen, when the additives were added, the maximum values were small in comparison with the cases without additives. In particular, the fluorophosphazen derivative decreased the maximum values of the bearing resistance.

Figure 33:
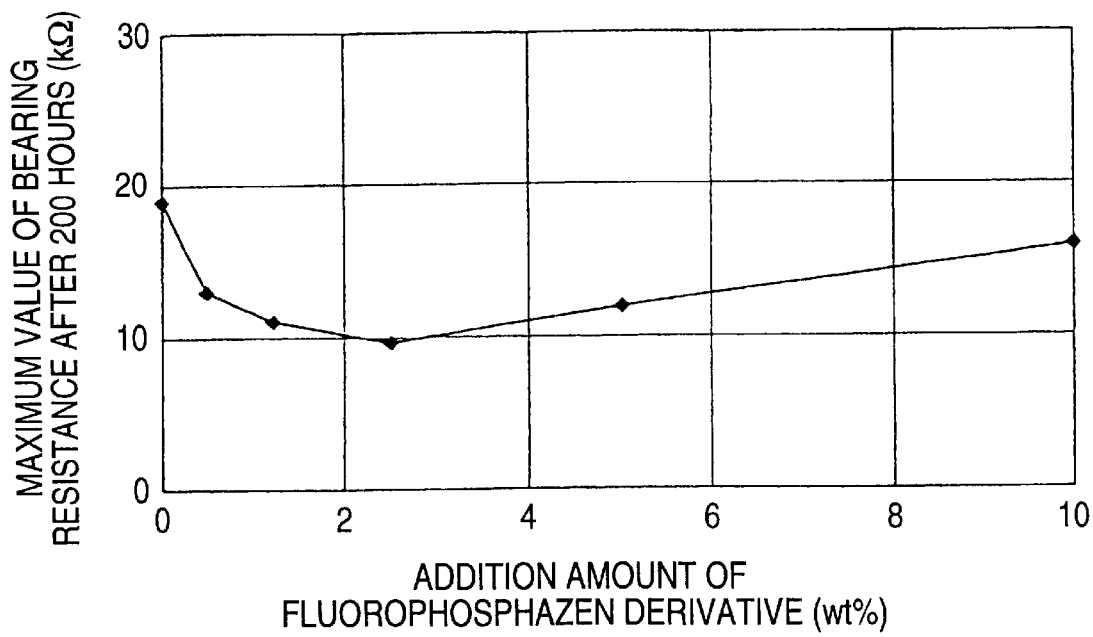
FIG. 33 is a graph showing the relationship between the amount of fluorophosphazen derivative added and the maximum value of the bearing resistance.

The maximum values of the bearing resistance were evaluated by changing addition amount of fluorophosphazen derivative. Results are shown in the graph of FIG. 33. The addition amount is not especially limited, but 10 wt % or lower based on the total weight of the grease is appropriate from the problem of dissolution.

Next reference will be made to results of evaluating the maximum values of the bearing resistance by changing the addition amount of the carbon black. The bearings were rotated at high temperature similarly to the above mentioned for 200 hours and then the maximum values of the bearing resistance were measured in the manner similar to the above. The structure of the test bearings are the same as for the bearing of the Reference example 3, except for changing the addition amount of the carbon black.

Figure 34:
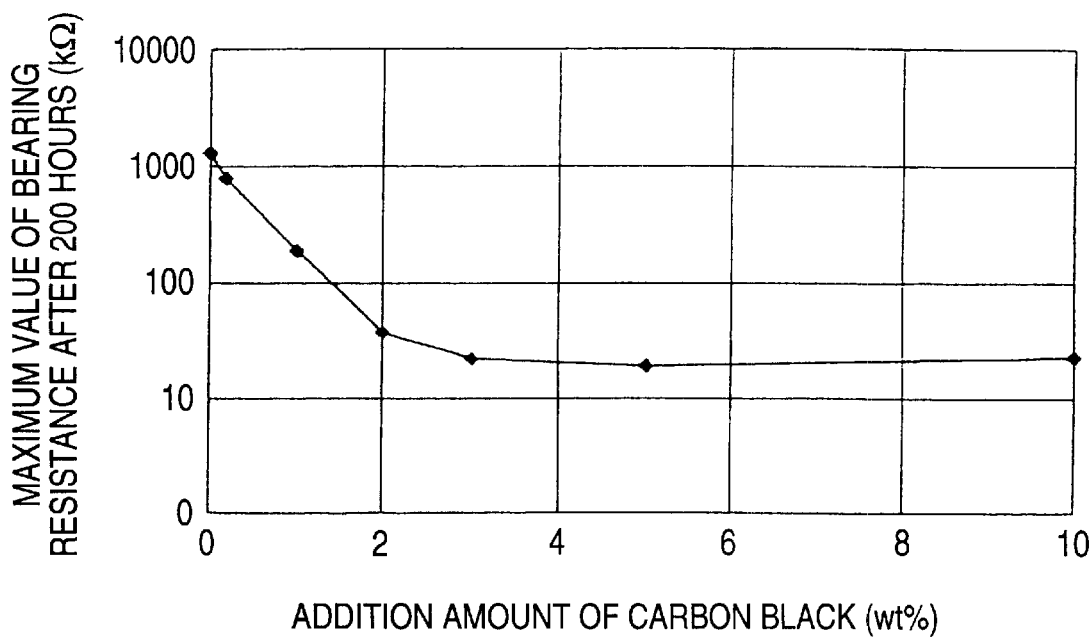
FIG. 34 is a graph showing the relationship between the amount of carbon black added and the maximum value of the bearing resistance.

Results are shown in a graph of FIG. 34, from which as seen the carbon black is effective even if being a small amount. Therefore, it can co-exist with the inherent thickener (silicon compound or fluorine compound), and it may be assumed that the dispersing state of carbon black can be kept favorable owing to this co-existence.

For moderating the worked penetration of the grease, the amount of the carbon black is desirably 10 wt % or lower based on the total weight of the grease. If being higher than it, the grease becomes too hard. For securing the enough conductivity, an addition of 0.2 wt % or higher based on the total weight of the grease is necessary.

Further reference will be made to results of changing a specific surface area of the carbon black (a value by nitrogen absorption method) and evaluating the maximum values of the bearing resistance. The bearings were rotated at high temperature similarly to the above mentioned for 200 hours and then the maximum values of the bearing resistance were measured in the manner similar to the above. The structure of the test bearings are the same as for the bearing of the Reference example 3, except that the specific surface area of the carbon black is different.

Figure 35:
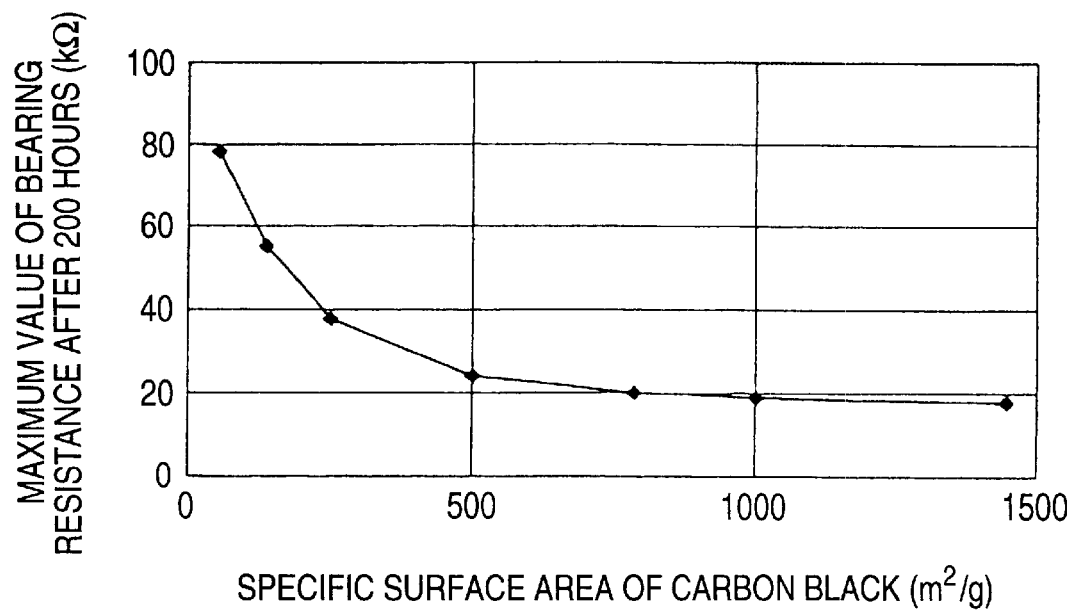
FIG. 35 is a graph showing the relationship between a specific surface area of carbon black and the maximum value of the bearing resistance.

Results are shown in the graph of FIG. 35, from which as seen, it is preferable that the specific surface area of the carbon black is 250 $m^2/g$ or more.

Still further reference will be made to results of changing the amount of DBP oil absorption of the carbon black (a value by a dibutyl phthalate absorb meter) and evaluating the maximum values of the bearing resistance. The bearings were rotated at high temperature similarly to the above mentioned for 200 hours and then the maximum values of the bearing resistance were measured in the manner similar to the above. The structure of the test bearings are the same as for the bearing of the Reference example 3 except that the DBP oil absorption amount of the carbon black is different.

Figure 36:
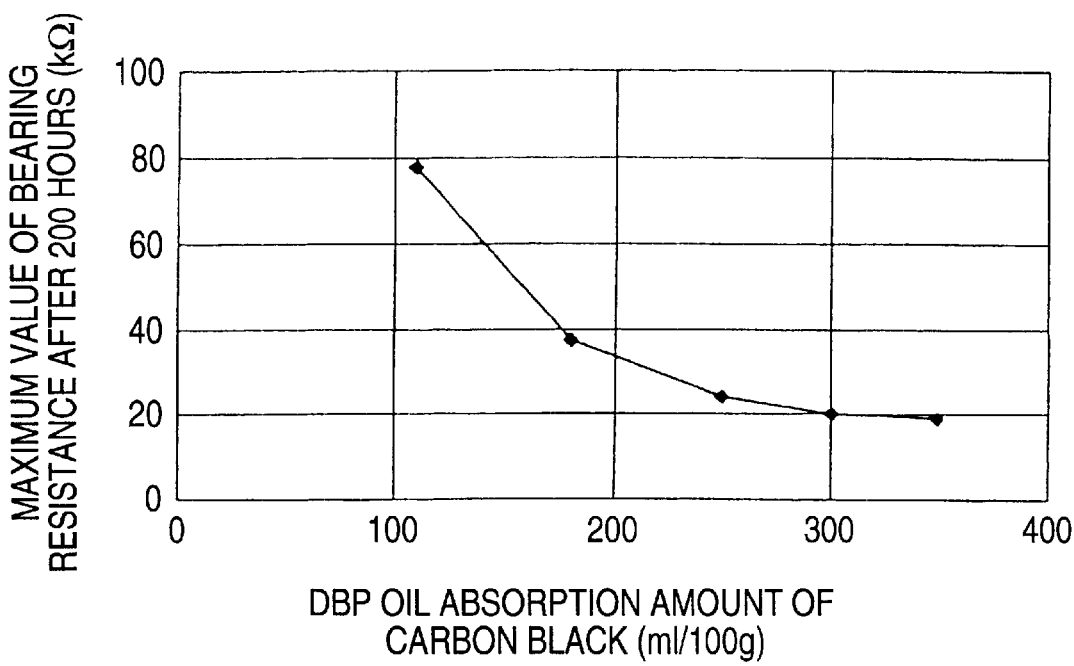
FIG. 36 is a graph showing the relationship between DBP (dibutyl phthalate) oil absorption amount of carbon black and the maximum value of the bearing resistance.

Results are shown in the graph of FIG. 36, from which as seen, it is preferable that the amount of the DBP oil absorption of the carbon black is 180 ml/100 g or more.

Yet further reference will be made to results of changing the kinematic viscosity of the used base oil at 40° C. and evaluating the maximum values of the bearing resistance. The bearings were rotated at high temperature similarly to the above mentioned for 200 hours and then the maximum values of the bearing resistance were measured in the manner similar to the above. The structure of the test bearings are the same as for the bearing of the Reference example 3, except that the kinematic viscosity of the used base oil at 40° C. is different.

Figure 37:
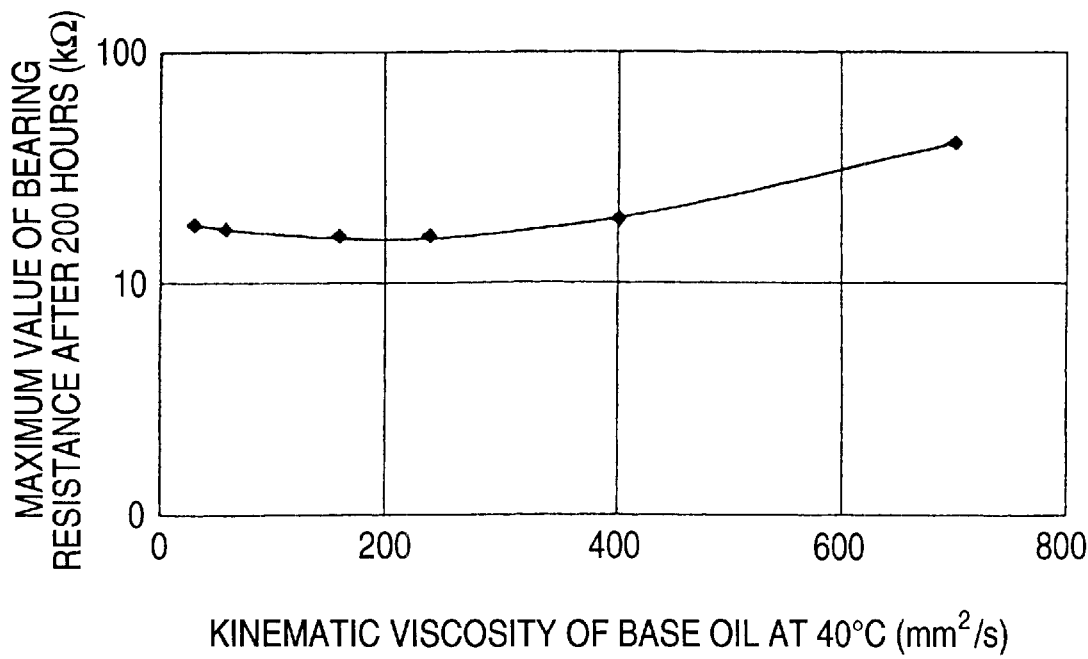
FIG. 37 is a graph showing the relationship between kinematic viscosity of the base oil and the maximum value of the bearing resistance.

Results are shown in the graph of FIG. 37, from which as seen, it is preferable that the kinematic viscosity of the used base oil at 40° C. is around 15 to 500 $mm^2/s$.

As mentioned above, the conductive grease of the invention is hard to cause the time-passing reduction of the conductivity.

The oil separation degree is determined to be 2% or lower, so that it is possible to secure the conductivity of the conductive grease and exactly remove influences owing to the static electricity for a long term. Accordingly, the rolling bearing of the invention can be improved in the reliability.

The bearing according to the invention as mentioned in Item (13) is excellent in the conductivity even at high temperatures as 180° C., so that the conductive state between the inner and outer races can be maintained preferable for a long time.

While the invention has been described in detail and with reference to specific embodiments thereof, it will be apparent to one skilled in the art that various changes and modifications can be made therein without departing from the spirit and scope thereof.

What is claimed is:

1. A conductive grease comprising a base oil, a thickener, a conductive solid powder and at least one kind of a wear inhibitor, an extreme pressure agent and an oiliness agent, wherein an amount of the conductive solid powder added is 0.1 to 10 wt % based on the total weight of the grease, and a total amount of the at least one kind of a wear inhibitor, an extreme pressure agent and an oiliness agent added is 0.1 to 10 wt % based on the total weight of the grease, wherein the conductive solid powder is selected from the group consisting of carbon black and acetylene black which each is a particle comprising as a main component a fibrous carbon, wherein the thickener is selected from the group consisting of a metallic soap and a urea compound, each addition amount thereof being 5 to 20 wt % based on a total weight of the grease, and a total amount of the thickener and the conductive solid powder is 5.1 to 20.1 wt % based on the total weight of the grease, wherein the wear inhibitor is at least one kind selected from the group consisting of orthophosphoric acid ester and phosphorous acid ester, wherein the extreme pressure agent is at least one kind selected from the group consisting of a metallic dithiophosphate compound and a metallic dithiocarbamate compound, and wherein the oiliness agent is at least one kind selected from the group consisting of succinic acid ester, carboxylic acid anhydride and alkenyl succinic acid anhydride.

2. The conductive grease as claimed in claim 1 which further comprises fine particle of inorganic compound having an average diameter of 0.05 to 2 $\mu$m in an amount of 0.05 to 7 wt % based on a total weight of the grease.

3. The conductive grease as claimed in claim 1 wherein the base oil is a single or a mixture of at least two kinds of mineral oil, synthetic hydrocarbon oil, ester oil, fluorine oil, ether oil and polyglycol oil, and kinematic viscosity thereof is 5 mm$^2$/s to 120 mm$^2$/s at 40° C.

4. The conductive grease as claimed in claim 1, wherein an amount of the base oil added is 75 to 90 wt % based on the total weight of the grease.

5. The conductive grease as claimed in claim 1, wherein the oil separation degree at 100° C. after 24 hours of the conductive grease is 0.5 to 2 wt %.

6. The conductive grease as claimed in claim 5, wherein an amount of the conductive solid powder added is 0.2 to 0.9 wt % based on the total weight of the thickener and the conductive solid powder.

7. A conductive grease comprising a base oil, a thickener, a conductive solid powder and at least one kind of a wear inhibitor, an extreme pressure agent and an oiliness agent, wherein the conductive solid powder is carbon black, an amount of carbon black being 0.2 to 10 wt % based on the total weight of the grease, and a total amount of the at least one kind of a wear inhibitor, an extreme pressure agent and an oiliness agent added is 0.1 to 10 wt % based on the total weight of the grease, wherein the base oil is a straight chain or side chain perfluoroalkylpolyether, perfluoroalkylpolyether introducing a carboxyl or isocyanate group into terminal group thereof, ester-modified or alcohol-modified perfluoroalkylpolyether, or a single or a mixture of at least two kinds of fluorine oil, silicone oil and fluorosilicone oil, the kinematic viscosity thereof being 15 mm$^2$/s to 500 mm$^2$/s at 40° C., and wherein the thickener comprises as a main component at least one selected from the group consisting of silicone compound and fluorine compound.

8. The conductive grease as claimed in claim 7, wherein the fluorine compound is polytetrafluoroethylene or ethylene trifluoride.

9. The conductive grease as claimed in claim 7, wherein the silicone compound is fine powder silica, synthetic mica, mica, or smectite.

10. The conductive grease as claimed in claim 7, which further comprises at least any one kind of the additives selected from the group consisting of nitrite, benzotriazol, MgO, Ca sulfonate, fluorophosphazen derivative, and MgS$_2$.

11. The conductive grease as claimed in claim 7, wherein a specific surface area of carbon black is 250 m$^2$/100 g or more.

12. The conductive grease as claimed in claim 7, wherein a dibutyl phthalate oil supply amount of carbon black is 180 ml/100 g or more.

13. A conductive grease comprising a base oil, a thickener, a conductive solid powder and at least one kind of a wear inhibitor, an extreme pressure agent and an oiliness agent, wherein an amount of the conductive solid powder added is 0.1 to 10 wt % based on the total weight of the grease, and a total amount of the at least one kind of a wear inhibitor, an extreme pressure agent and an oiliness agent added is 0.1 to 10 wt % based on the total weight of the grease, and wherein the conductive solid powder is carbon nano-tube having diameter of 1 to 24 nm and length of 0.5 to 30 $\mu$m.

14. The conductive grease as claimed in claim 13, which further comprises, as conductive additives, particles having carbon or carbon black or acetylene black being main components, metallic particles of gold, silver, copper, tin, zinc or aluminum, or metallic compound particles of silver oxide, niobium sulfide or silver nitrate.

15. A rolling apparatus comprising an outer member, an inner member and a plurality of rolling elements rotatably arranged between the outer and inner members, and being packed with a conductive grease applied between the inner and outer members and the rolling elements, said conductive grease comprising a base oil, a thickener, a conductive solid powder, and at least one kind of a wear inhibitor, an extreme pressure agent and an oiliness agent, wherein an amount of the conductive solid powder added is 0.1 to 10 wt % based on the total weight of the grease, and a total amount of the at least one kind of a wear inhibitor, an extreme pressure agent and an oiliness agent added is 0.1 to 10 wt % based on the total weight of the grease, wherein the conductive solid powder is selected from the group consisting of carbon black and acetylene black which each is a particle comprising as a main component a fibrous carbon, an addition amount of the thickener is 5 to 20 wt % based on a total weight of the grease, and a total amount of the thickener and the conductive solid powder is 5.1 to 20.1 wt % based on the total weight of the grease.

16. The rolling apparatus as claimed in claim 15, which further comprises a contacting seal between the outer member and the inner member, said seal being conductive.

17. The rolling apparatus as claimed in claim 15, wherein the rolling apparatus is a rolling/bearing, the outer member is an outer race, and the inner member is an inner race.

18. The rolling apparatus as claimed in claim 15, wherein the rolling apparatus is a linear guide, the outer member is a slider, and the inner member is a guide rail.

19. The rolling apparatus as claimed in claim 15, wherein the rolling apparatus is a ball screw, the outer member is a ball nut, and the inner member is screw shaft.

* * * * *